(12) United States Patent
Nakayama et al.

(10) Patent No.: US 6,209,097 B1
(45) Date of Patent: Mar. 27, 2001

(54) CONTENT PROTECTION METHOD AND CONTENT PROTECTION SYSTEM

(75) Inventors: Ryo Nakayama; Isamu Iwamoto, both of Tokyo (JP)

(73) Assignee: Tokyo Electron Device Limited (JP)

( * ) Notice: Subject to any disclaimer, the term of this patent is extended or adjusted under 35 U.S.C. 154(b) by 0 days.

(21) Appl. No.: 09/204,000

(22) Filed: Dec. 1, 1998

(30) Foreign Application Priority Data

Dec. 5, 1997 (JP) .................................................. 9-335621
Mar. 31, 1998 (JP) ................................................ 10-086148
May 21, 1998 (JP) ................................................ 10-139442

(51) Int. Cl.[7] .................................................... G06F 01/24
(52) U.S. Cl. ........................... 713/193; 713/200; 713/201; 380/52; 380/56
(58) Field of Search ....................... 380/52, 56; 713/193, 713/200, 201

(56) References Cited

U.S. PATENT DOCUMENTS 5,204,901 * 4/1993 Hershey et al. ......................... 380/21
5,345,508 * 9/1994 Lynn et al. ............................. 380/46
5,473,696 * 12/1995 Breemen et al. ....................... 380/49
5,754,657 * 5/1998 Schipper et al. ....................... 380/25
6,055,575 * 4/2000 Paulsen et al. ....................... 709/229

* cited by examiner

*Primary Examiner*—Thomas R. Peeso
(74) *Attorney, Agent, or Firm*—Baker & McKenzie

(57) ABSTRACT

A recording medium in which a purchased image protected by a copyright or the like has been stored and a recording medium in which a user image has been stored is set, the purchased image as encrypted is decrypted and the images stored in both mediums are processed. The ID of a created image, user image data, link information representing encrypted purchased image data or the storage location of the purchased image data, and data specifying an image processing mode and the number of prints, are stored in a recording medium. In a DPE shop or the like, the purchased image data stored in the recording medium is decrypted, and the image processed by the user is reconstructed and printed in accordance with the data stored in the recording medium. A management center may give the allowance of use of the purchased image to the DPE shop, and the management center draws royalties from the accounts of individual DPE shops, sums the royalties and pays them into the accounts of individual proprietors of rights.

17 Claims, 18 Drawing Sheets

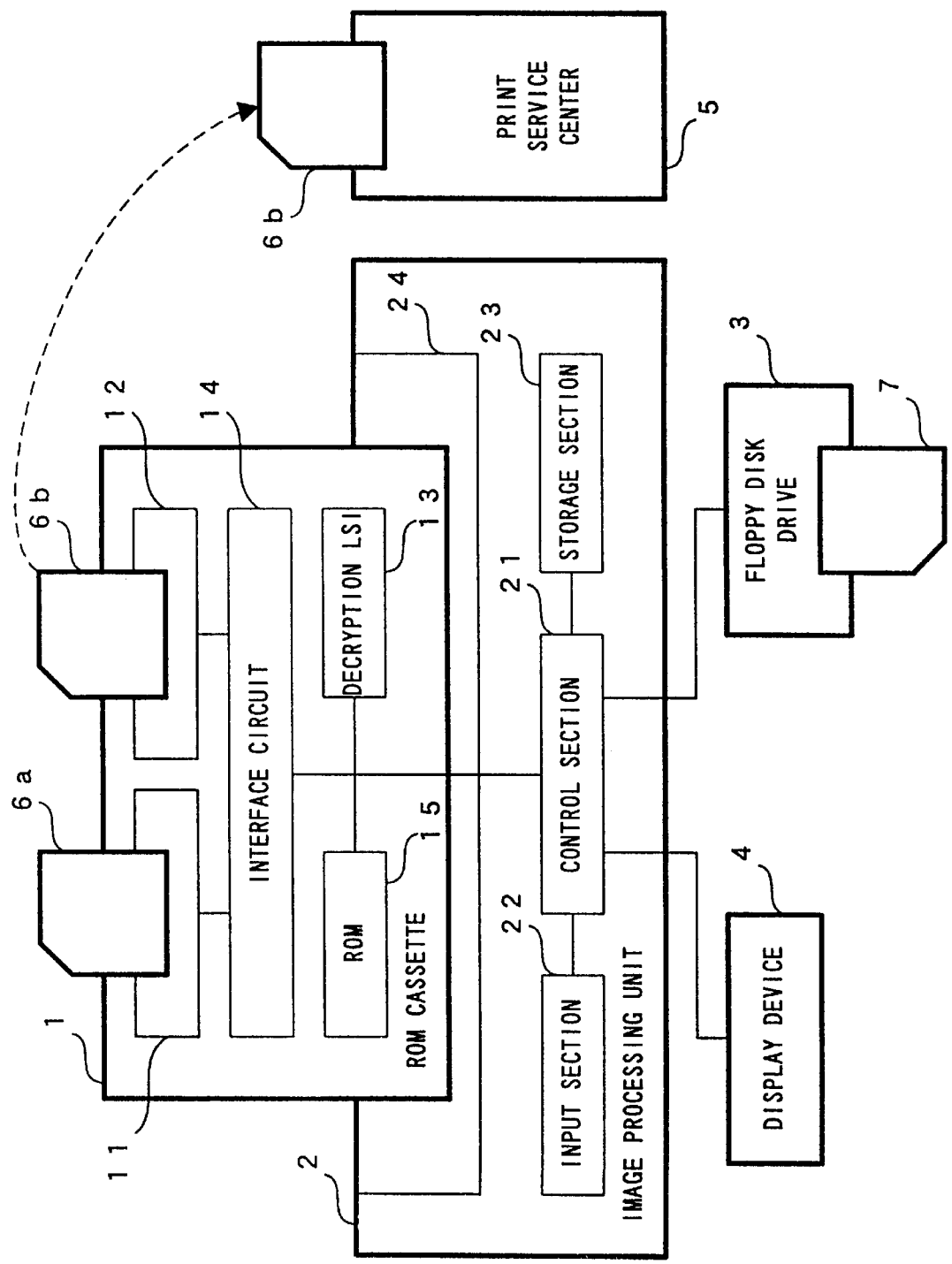
F I G. 1

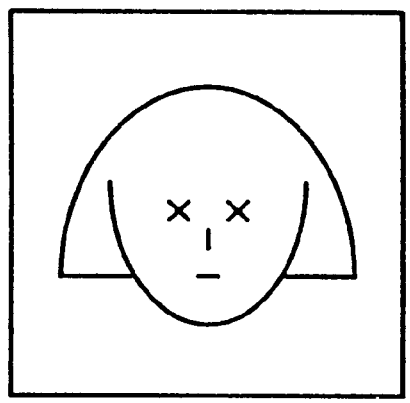
(A)
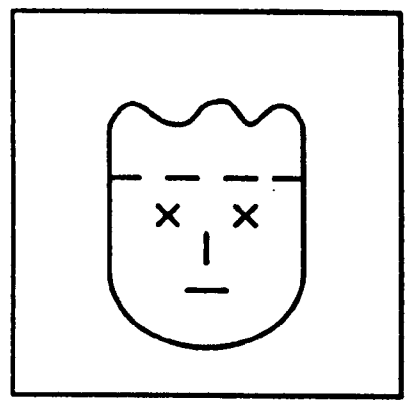
(B)
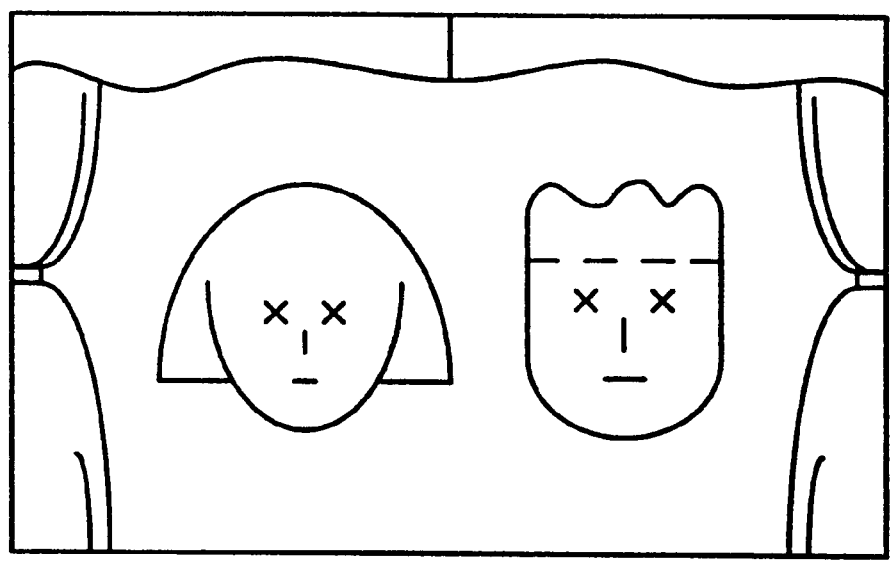
(C)
FIG. 4

| IMAGE ID | IMAGE NAME | ID OF PURCHASED IMAGE | USER IMAGE | MODE DATA | NUMBER OF PRINTS |
|---|---|---|---|---|---|
| 33 | MyMy | △△△△ | ××××<br>(JPEG) | ○○○ | 2 |
| 34 | KaKa | **** | ○○○○<br>(JPEG) | ▽▽▽ | 1 |

F I G. 6

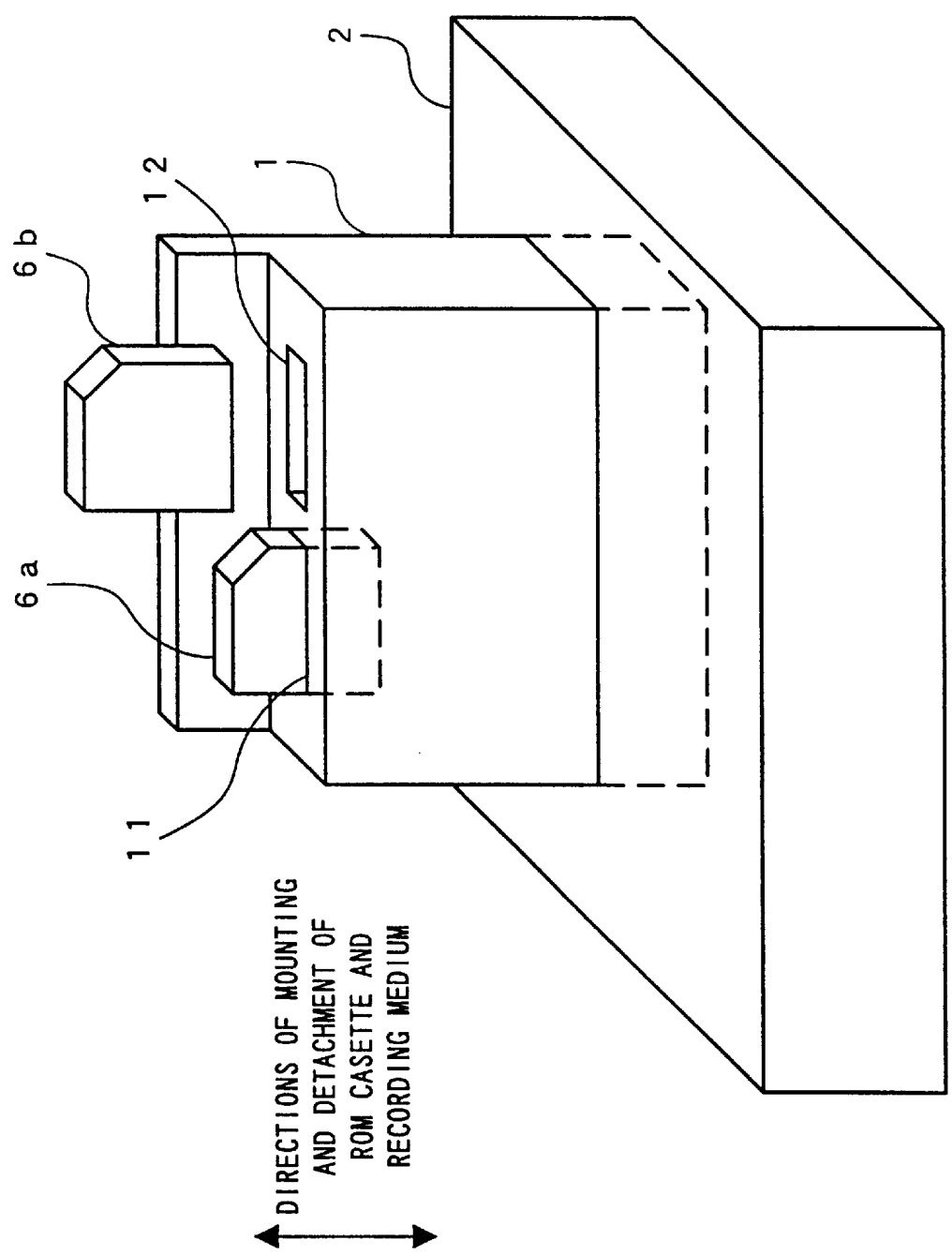
F I G. 7

| IMAGE ID | IMAGE NAME | ID OF PURCHASED IMAGE | USER IMAGE | MODE DATA | WHETHER PRINTING IS NECESSARY OR NOT | NUMBER OF PRINTS |
|---|---|---|---|---|---|---|
| 33 | MyMy | 10245 | xxxx (JPEG) | ○○○ | NECESSARY | 2 |
| 34 | KaKa | 3310 | ○○○○ (JPEG) | ▽▽▽ | UNNECESSARY | |

F I G. 1 1

| IMAGE ID | PROPRIETOR ID | UNIT PRICE<br><br>NUMBER OF PRINTS LESS THAN 10 | UNIT PRICE<br><br>NUMBER OF PRINTS NOT LESS THAN 10 |
|---|---|---|---|
| 0 0 0 0 1 | | | |
| 0 0 0 0 2 | | | |
| ⋮ | | | |
| n | | | |

FIG. 13

| ELECTRONIC MONEY ID | INITIAL MONETARY VALUE | MONETARY AMOUNT TO BE REMITTED (MONETARY AMOUNT TO BE TRANSFERED) | REMITTEE | TRANSFER DATE | AUTHEN-TICATION | OTHER DATA |
|---|---|---|---|---|---|---|

FIG. 14

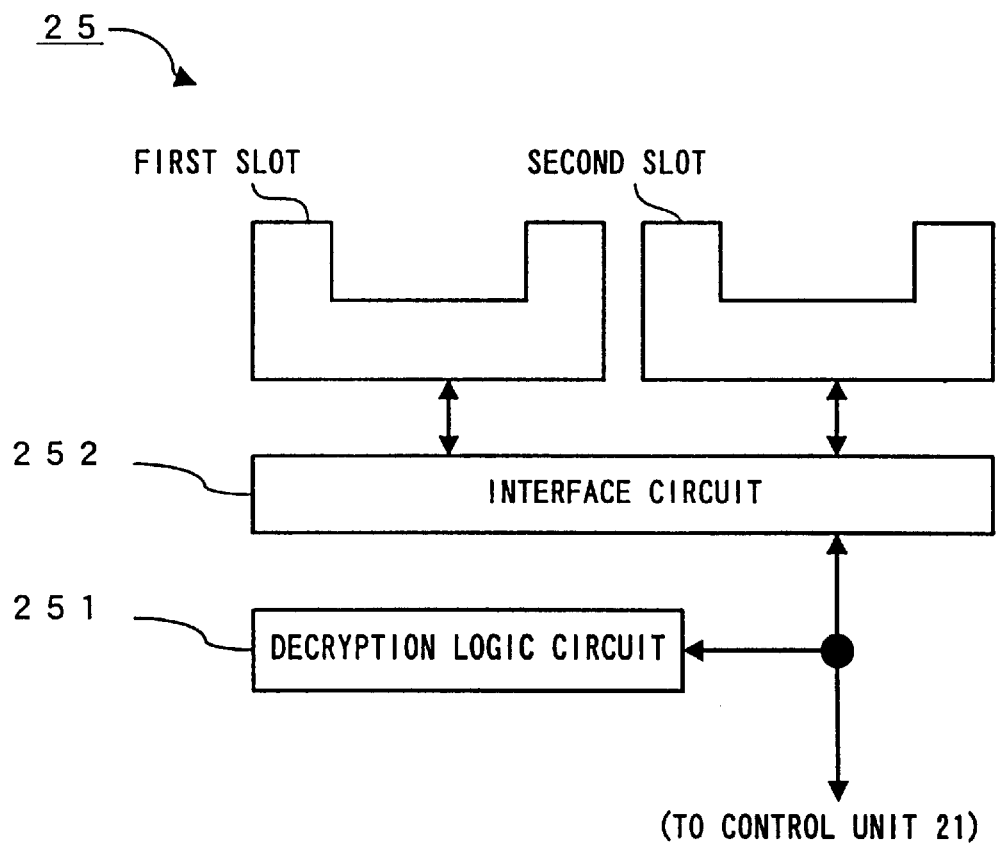
F I G. 16

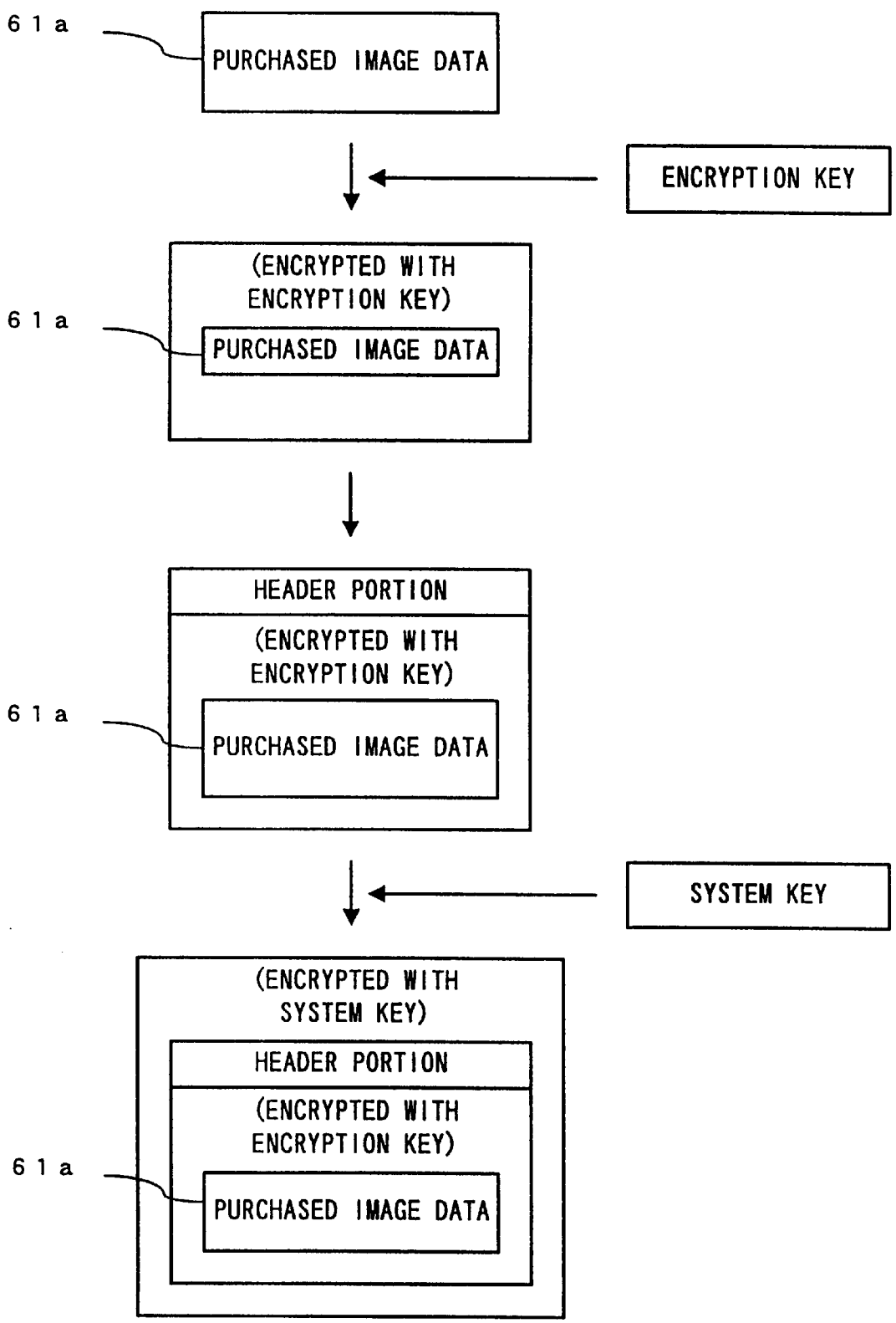
F I G. 1 7

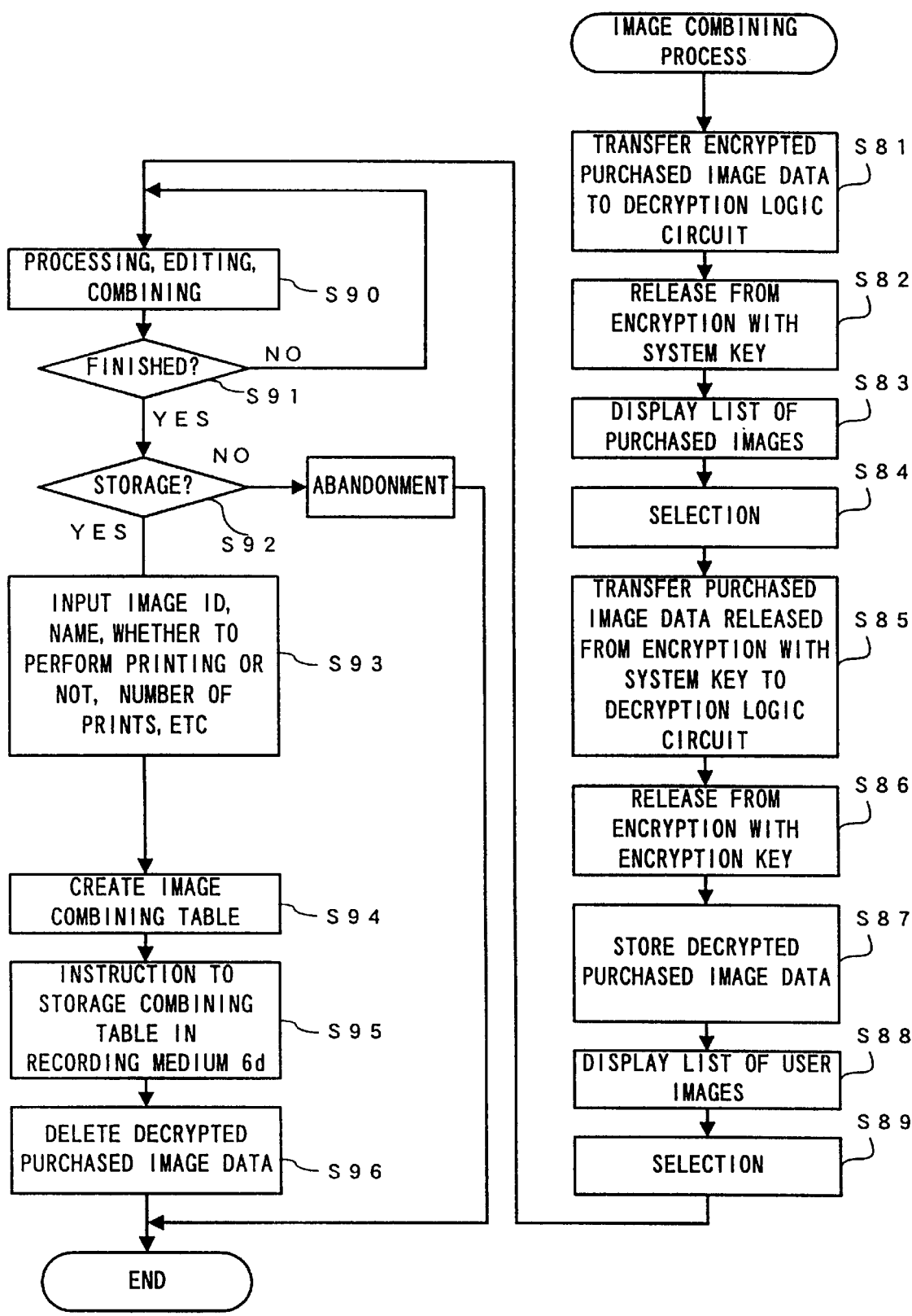
F I G. 1 8

CONTENT PROTECTION METHOD AND CONTENT PROTECTION SYSTEM

This patent application claims priority, based on the Paris Convention, of Japanese Patent Application No. 9-335621 filed with the Japanese Patent Office on Dec. 5, 1997, Japanese Patent Application No. 10-86148 filed with the Japanese Patent Office on Mar. 31, 1998, and Japanese Patent Application No. 10-139442 filed with the Japanese Patent Office on May 21, 1998, and the contents of those Japanese Patent Applications are incorporated herein by reference.

BACKGROUND OF THE INVENTION

1. Field of the Invention

This invention relates to a contents processing system, a charging system and so on which permit harmony to be established between the protection and use of contents protected by portrait rights, copyrights, etc.

2. Description of the Related Art

Processing and editing various contents, for example, image data, and outputting them as hard copies from color printers, etc. are becoming possible due to the progress of a digital image processing technology.

However, if the processing, editing and outputting of the contents are allowed without order, copyrights and portrait rights are not protected, and the advantages of the proprietors of the rights will be detracted.

On the other hand, if the use of these contents is extremely limited, the contents will not be utilized.

Furthermore, although the contents are to be protected by copyrights and portrait rights, the right for the private and diversional use of the contents is ensured within certain limits. Therefore, the private use of the contents needs to be allowed to some degree.

In order to satisfy these requirements, a technique such as digital watermarking has also been proposed. However, the processing of data is complicated, and a complex system is required. Moreover, a system which performs data processing such as digital watermarking or the like has to be a dedicated system structured for the purpose of performing normally the processing. Due to this, from the point of view of a user who is not well acquainted with a data processing technique, the system is not easy to use.

SUMMARY OF THE INVENTION

This invention has been made in consideration of the above-described circumstances, and an object thereof is to provide a simple and convenient system and method which permit the contents protected by various rights like a copy right, a portrait right, etc. to be used privately in such a manner as enjoying the processing and editing of the contents on a screen, while establishing harmony between those various rights and the right to privately use the contents.

Another object of the present invention is to provide a simple and convenient system and method by which a charge for using the contents can be collected when making hard copies of the contents protected by various rights such as a copyright, a portrait right, etc.

In order to achieve the above objects, a contents processing system according to the first aspect of this invention is characterized by comprising:

first medium mounting means for detachably mounting a first recording medium including encrypted contents stored therein;

second medium mounting means for detachably mounting a second recording medium including non-encrypted contents stored therein;

third medium mounting means for detachably mounting a third recording medium;

first selection means for selecting arbitrary contents from the encrypted contents stored in the first recording medium in accordance with an instruction from an operator, and for decrypting the selected encrypted contents to generate first contents;

second selection means for selecting arbitrary second contents from the non-encrypted contents stored in the second recording medium in accordance with an instruction from the operator;

combining means for combining the first contents and the second contents in accordance with an instruction from the operator, and creating combining mode data which represents a combining mode; and recording means for storing, in the third recording medium, the encrypted contents representing the first contents, the second contents and the combining mode data, in response to an instruction from the operator.

According to such a contents processing system, the encrypted contents are in a decrypted state while being used in the combining, and are in an encrypted state at the point in time when they are stored in the third recording medium. Consequently, in order to reproduce the combined contents on the basis of the data stored in the third recording medium, the encrypted contents need to be specially decrypted. Because of this, the contents protected by various rights are used privately while being protected against illicit use due to the contents being encrypted in advance.

The second recording medium is diverted to the storage of the combination result when the recording means comprises encrypted contents recording means for storing the encrypted contents representing the first contents and the combining mode data in the second recording medium, in response to an instruction from the operator.

When the contents processing system comprises output means for acquiring the encrypted contents stored in the recording medium, the second contents and the combining mode data, decrypting the encrypted contents to generate the first contents, combining the first contents and the second contents on the basis of the combining mode data as acquired, and outputting an image obtained by the combining, the combined contents are reproduced by the output means. If the output means is independently operated with the user's payment of a worth or the like being determined as an image outputting condition, a variety of rights set to the first contents are protected in case of outputting the image.

Furthermore, a contents processing system according to the second aspect of this invention is characterized by comprising:

first medium mounting means for detachably mounting a first recording medium including encrypted contents stored therein;

second medium mounting means for detachably mounting a second recording medium including non-encrypted contents stored therein;

third medium mounting means for detachably mounting a third recording medium;

first selection means for selecting arbitrary contents from the encrypted contents stored in the first recording medium in accordance with an instruction from an operator, and for decrypting the selected encrypted contents to generate first contents;

second selection means for selecting arbitrary second contents from the non-encrypted contents stored in the second recording medium in accordance with an instruction from the operator;

combining means for combining the first contents and the second contents in accordance with an instruction from the operator, and creating combining mode data which represents a combining mode; and recording means for storing instruction data which identifies the first contents, the second contents and the combining mode data in the third recording medium, in response to an instruction from the operator.

According to such a contents processing system, the encrypted contents are in a decrypted state while being used in the combining, and moreover, the encrypted contents themselves are not stored in the third recording medium, and the information which identifies the contents is stored therein. Consequently, in order to reproduce the combined contents on the basis of the data stored in the third recording medium, the encrypted contents need to be specially supplied. Because of this, the contents protected by various rights are used privately while being protected against illicit use due to the contents being encrypted in advance.

The second recording medium is diverted to the storage of the combination result when the recording means comprises instruction data recording means for storing sad instruction data and the combining mode data in the second recording medium, in response to an instruction from the operator.

When the contents processing system comprises output means for acquiring the instruction data stored in the recording medium, the second contents and the combining mode data, acquiring the first contents designated by the instruction data, combining the first contents and the second contents on the basis of the combining mode data as acquired, and outputting an image obtained by the combining, the combined contents are reproduced by the output means. It the output means is independently operated with the user's payment of the worth or the like being determined as an image outputting condition, a variety of rights set to the first contents are protected in case of outputting the image.

The instruction data may contain address information for specifying a logical location at which the first contents have been stored. In this case, the output means needs only comprise retrieval means for acquiring the first contents stored at the logical location specified by the address information contained in the instruction data.

The output means may include printing means for printing the image. In this case, the combining mode data contains information specifying a number by which the image is to be printed by the printing means, and the printing means may comprise designated number printing means for printing the image by the number designated by the combining mode data.

When the combining means comprises editing means for processing and/or editing at least one of the first and second contents, the first and second contents are not only superposed on one another, but also changed into desired states.

A contents processing system according to the third aspect of this invention is characterized by comprising:

medium mounting means for mounting a first recording medium in which contents protected by a predetermined right have been stored, mounting a second recording medium in which contents have been stored, and mounting a third recording medium;

first selection means for selecting arbitrary first contents from the contents stored in the first recording medium;

second selection means for selecting arbitrary second contents from the contents stored in the second recording medium;

combining means for combining the first contents selected by the first selection means and the second contents selected by the second selection means;

display means for displaying data synthesized by the combining means;

printing instruction means for issuing an instruction to print an image synthesized by the combining means; and recording means for storing, in the third recording medium, instruction data which designates the first contents, the second contents and data which represents a mode of combining the first contents and the second contents, in response to the instruction issued by the printing instruction means; and wherein when storing data, which specifies details of combined contents, in the third recording medium for the sake of printing by an external printing agency, the first contents themselves, protected by the predetermined right, are not stored in the third recording medium.

With this structure also, harmony can be established between the use of the contents and the protection of the right. Furthermore, since the first contents are not stored in the recording medium, the surreptitious use of the contents can be prevented.

The medium mounting means may comprise means for detachably mounting at least one of the first, second and third recording mediums.

The contents processing system may comprise means for detecting a printing instruction, means for detecting whether an image to be printed includes the contents recorded in the first recording medium, and means for inhibiting printing when it is determined that the image to be printed includes the contents recorded in the first recording medium.

The contents stored in the first recording medium are encrypted ones; and at least one of the first selection means and the combining means may comprise decryption means for decrypting the contents stored in the first recording medium.

With this structure, the illicit use of the contents stored in the first recording medium can be prevented.

Moreover, a contents protecting system according to the fourth aspect of this invention is characterized by comprising:

to-be-output data generating means for generating to-be-output data including protected contents, an output of which requires payment of a worth, and for storing the generated to-be-output data in a recording medium;

contents output means, in which the recording medium is set, for reading out the to-be-output data from the recording medium, reporting the protected contents included in the to-be-output data, and outputting the to-be-output data; and charging means for making a charge for printing the contents, in response to a report from the contents output means.

With this structure, the use of the contents and the charging for the use can be realized with harmony being established therebetween, as in the case of the above-described contents protection method.

The to-be-output data generating means comprises, for example, a processing device which is capable of displaying the protected contents but is not capable of effecting printing.

With such a structure, the to-be-output data can be created by editing and processing the protected contents, and the illicit output or printing can be assuredly prevented.

For example, the to-be-output data generating means comprises:

contents storage means for storing a plurality of protected contents;

selection means for selecting arbitrary contents from the protected contents stored in the contents storage means; and means for processing and/or editing the contents selected by the selection means.

With this structure, an arbitrary image can be selected from arbitrary protected images, and can be processed and edited.

Each of the protected contents which are stored in the contents storage means may have been encrypted. In this case, the to-be-output data generating means comprises decryption means for decrypting each of the protected contents.

With this structure, the illicit use of the protected contents can be prevented.

Each of the protected contents which are stored in the contents storage means has been encrypted by using an encryption key associated with each of the protected contents; and the decryption means comprises means for decrypting each of the protected contents by using the encryption key associated with each of the protected contents which are stored in the contents storage means.

According to this structure, since the encryption key is necessary in order to use the protected contents, the risk of the illicit use of the protected contents can be further reduced.

Each of the protected contents which are stored in the contents storage means have been encrypted by using the encryption key and further encrypted with a predetermined system key; and the decryption means comprises means for decrypting, with the system key, each of the protected contents which are stored in the contents storage means, and thereafter further decrypting each of the protected contents by using the encryption key associated with each of the protected contents.

According to this structure, since both the system key and the encryption key are necessary in order to use the protected contents, the risk of the illicit use of the protected contents can be further reduced.

The contents storage means and the decryption means may have been detachably attached to each other.

According to this structure, the protected contents are disconnected from the decryption means which supplies the encryption key and the system key, and therefore the secrecy and anonymity of the details of the protected contents are more reliably ensured.

For example, the to-be-output data generating means comprises:

no-charge contents storage means for storing contents on which no charge is made; and means for combining the protected contents and the no-charge contents.

With this structure, a protected image such as a star's photograph, for example, can be combined for pleasure with an ordinary image like a self-portrait photograph, and can be output (especially, printed) upon payment of the worth.

For example, the to-be-output data generating means stores, in the recording medium, specifying information for specifying the protected contents and mode information for specifying a mode of processing and/or editing the protected contents, but does not store the protected contents themselves in the recording medium. In this case, storage means for storing protected contents which are substantially identical with the protected contents which the to-be-output data generating means preserves, and the output means reads out the protected contents from the storage means on the basis of the specifying information stored in the recording medium, and processes and/or edits the read-out protected contents on the basis of the mode information.

According to this structure, the surreptitious use of protected image data in the recording medium can be prevented because the protected contents are not recorded in the recording medium.

The specifying information includes, for example, address information for specifying a logical location, in the storage means, at which the protected contents have been stored.

In this case, the output means reads out, from the storage means, the protected contents stored at the logical location specified by the address information contained in the specifying information, and processes and/or edits the read-out protected contents on the basis of the mode information.

The to-be-output data generating means and the output means may be designed so that recording mediums, including substantially identical contents stored therein, can be detachably mounted in the to-be-output data generating means and the output means, respectively.

The contents output means includes, for example, means for printing the to-be-output data. In particular, printing or imaging on a positive film and a negative film is significant as an output mode, and according to this structure, printing can be achieved.

The to-be-output data generating means comprises means for storing, in the recording medium, a number by which the to-be-output data is to be printed. In this case, the output means prints the to-be-output data by the number stored ins the recording medium.

The output means has been assigned an identification code, and comprises means for reporting, to the charging means, the identification code corresponding to the output means; and the charging means makes a charge against one having the reported identification code.

By so doing, a royalty for the contents is collected from a shop having the output means installed therein or from a person or the like who owns the output means. Meanwhile, the shop, etc. can include the royalty in the worth received from a contents outputter.

Furthermore, the charging means may be connected through communications to a computer system in a financial agency and may comprise means for drawing the worth from an account associated in advance with the reported identification code.

Moreover, the output means may comprise means for sending, to the charging means, electronic money which corresponds to the charge.

With those structures, the worth can be assuredly collected with ease.

The charging means may be designed to receive the electronic money from the output means and to send a report of output allowance to the output means upon receipt of the electronic money which corresponds to the charge, and the output means may be designed to output the to-be-output data in response to the report of output allowance.

With those structures, the worth can be collected assuredly.

The charging means may comprise summing means for summing monetary amounts charged in association with a proprietor, and means for paying money to the proprietor in accordance with the sum obtained by the summing means.

With this structure, the worth of the use of the right can be assuredly paid to the proprietor with ease.

For example, the to-be-output data generating means stores, in the recording medium, specifying information for specifying the protected contents and mode information for specifying a mode of processing and/or editing the protected contents, but does not store the protected contents themselves in the recording medium;

the output means stores, in an encrypted state, protected contents which are substantially identical with the protected contents which the to-be-output data generating means preserves;

the charging means reports a decryption key to the output means in response to the report; and based on the specifying information stored in the recording medium, the output means reads out the protected contents by using the decryption key, decrypts the protected contents with the decryption key, and processes and/or edits the decrypted protected contents on the basis of the mode information.

By employing this structure, the surreptitious use of the protected contents, etc. can be prevented. Needless to say, any other protection means can be arranged.

A contents processing control device according to the fifth embodiment of this invention is characterized by comprising:

first medium mounting means for detachably mounting a first recording medium including non-encrypted contents stored therein;

second medium mounting means for detachably mounting a second recording medium;

decryption means for acquiring encrypted contents representing encrypted first contents, decrypting the encrypted contents, and sending the decrypted first contents to a supplier of the encrypted contents; and control means for controlling a computer, detachably connected thereto and comprising means for detachably mounting a third recording medium including the encrypted contents stored therein, so as to cause the computer to serve as first selection means for accessing the first recording medium in accordance with an instruction from an operator and for selecting arbitrary second contents from the non-encrypted contents, second selection means for acquiring arbitrary contents from the encrypted contents stored in the third recording medium in accordance with an instruction from the operator and for supplying the acquired encrypted contents to the decryption means as ones representing the first contents, combining means for acquiring the first contents supplied from the decryption means, combining the first contents and the second contents in accordance with an instruction from the operator and creating combining mode data representing a combining mode, and storage means for accessing the second recording medium in response to an instruction from the operator and for storing, in the third recording medium, the encrypted contents representing the first contents, the second contents and the combining mode data.

According to such a contents processing control device and the computer which is controlled by the contents processing control device, the encrypted contents are in a decrypted state while being used in the combining, and are in an encrypted state at the point in time when they are stored in the third recording medium. Consequently, in order to reproduce the combined contents on the basis of the data stored in the third recording medium, the encrypted contents need to be specially decrypted. Because of this, the contents protected by various rights are used privately while being protected against illicit use due to the contents being encrypted in advance.

A contents processing method according to the sixth aspect of this invention is characterized by comprising:

a first medium mounting step of detachably mounting a first recording medium including encrypted contents stored therein;

a second medium mounting step of detachably mounting a second recording medium including non-encrypted contents stored therein;

a third medium mounting step of detachably mounting a third recording medium;

a first selection step of selecting arbitrary contents from the encrypted contents stored in the first recording medium in accordance with an instruction from an operator, and decrypting the selected encrypted contents to generate first contents;

a second selection step of selecting arbitrary second contents from the non-encrypted contents stored in the second recording medium in accordance with an instruction from the operator;

a combining step of combining the first contents and the second contents in accordance with an instruction from the operator, and creating combining mode data representing a combining mode; and a recording step of storing, in the third recording medium, the encrypted contents representing the first contents, the second contents and the combining mode data, in response to an instruction from the operator.

According to such a contents processing method, the encrypted contents are in a decrypted state while being used in the combining, and are in an encrypted state at the point in time when they are stored in the third recording medium. Consequently, in order to reproduce the combined contents on the basis of the data stored in the third recording medium, the encrypted contents need to be specially decrypted. Because of this, the contents protected by various rights are used privately while being protected against illicit use due to the contents being encrypted in advance.

A contents protection method according to the seventh aspect of this invention is characterized by comprising:

generating to-be-printed data including protection target contents with a processing device which is inhibited to perform printing, and storing the to-be-printed data as generated in a recording medium;

printing, at a predetermined shop, the to-be-printed data stored in the recording medium on a precondition of paying a predetermined worth, and reporting the protection target contents included in the to-be-printed data to a predetermined center; and the center making a charge for printing the contents, in accordance with the report, and sending at least a part of money, obtained by making the charge, to a proprietor of a right to the contents;

whereby the charge is made for printing the protection target contents and a royalty is paid to the proprietor of the right to the contents.

According to this structure, an image including the contents protected by various rights can be processed with the processing device by using a variety of techniques, but cannot be printed. In the case of printing the generated contents, the created data is temporarily stored in a recording medium, and is printed in a predetermined shop. At that time, the use of the contents is reported to the center, and the center charges the royalty. Thus, while the use of the contents is being allowed, the charge for the use can be made.

For example, the protection target contents include an image protected by a portrait right or a copyright;

the to-be-printed data includes an image generated by processing and/or editing the protected image;

the report to the center contains information specifying the protected image and the number of prints; and the center makes the charge, calculating the royalty from the reported image and the number of prints, and sums royalties associated with the proprietor and forwards a remittance to the proprietor on the basis of a value of the sum.

The protected image, with which the processing device is equipped, may have been encrypted.

In this case, the processing device decrypts the protected image, and processes and/or edits the decrypted image to generate the to-be-output data.

According to this structure, a famous person's photograph (the protected contents) protected by a copyright and a portrait right and a self-portrait photograph are processed, edited and combined to arbitrarily create a two-shot image. However, the charge is made for printing the synthesized image. In this case, the center makes the charge in accordance with the used image and the number of prints thereof, and forward a remittance to the proprietor. Thus, the royalty can be assuredly collected and remitted to the proprietor, while the use of the contents is being realized.

A printer pays a printing charge including the charged monetary amount to the shop, while the center charges against the shop. The payment may be an automatic payment from an account or the like.

The processing device and the shop are equipped with substantially identical contents;

the processing device stores, in the recording medium, contents specifying information which specifies the contents and processing information which represents a processing and/or editing mode; and the shop reads out the contents specifying information and the processing information from the recording medium, regenerates the to-be-output data on the basis of the read-out data, and prints the regenerated data, whereas the contents themselves are not stored in the recording medium.

According to this method, since the contents themselves are not stored in the medium, the surreptitious use and illicit use of the protected contents can be prevented.

The center reports printing allowance to the shop; and the shop may be designed to print the to-be-printed data only in the case where it receives a report of printing allowance.

According to such a structure, printing can be conducted after the center has assuredly made the charge or only in the case where the charging has become possible, and the charging can be performed assuredly.

The center may be run by using at least a part of a profit resulting from the charging.

A computer readable recording medium may be distributed which contains a program stored therein for causing a computer to serve as all or some of the means of the above-described system and for causing the computer to execute all or some of the steps of the above-described method.

BRIEF DESCRIPTION OF THE DRAWINGS

FIG. 1 is a block diagram illustrating the basic structure of a contents processing system according to the first embodiment of this invention;

FIG. 4 is a diagram showing an example of the image combining method;

FIG. 6 is a diagram showing the data structure of an image combining table;

FIG. 7 is a diagram showing the positional relationship between a ROM cassette, the image processing device and a recording medium;

FIG. 11 is a diagram showing the data structure of the image combining table;

FIG. 13 is a diagram showing an example of a unit price table;

FIG. 14 is a diagram showing an example of the format of electronic money;

FIG. 16 is a diagram showing the physical structure of a recording medium driver;

FIG. 17 is a diagram showing the data structure of encrypted purchased image data; and FIG. 18 is a flowchart for explaining an image combining process.

DETAILED DESCRIPTION OF THE PREFERRED EMBODIMENT

Figure 2:
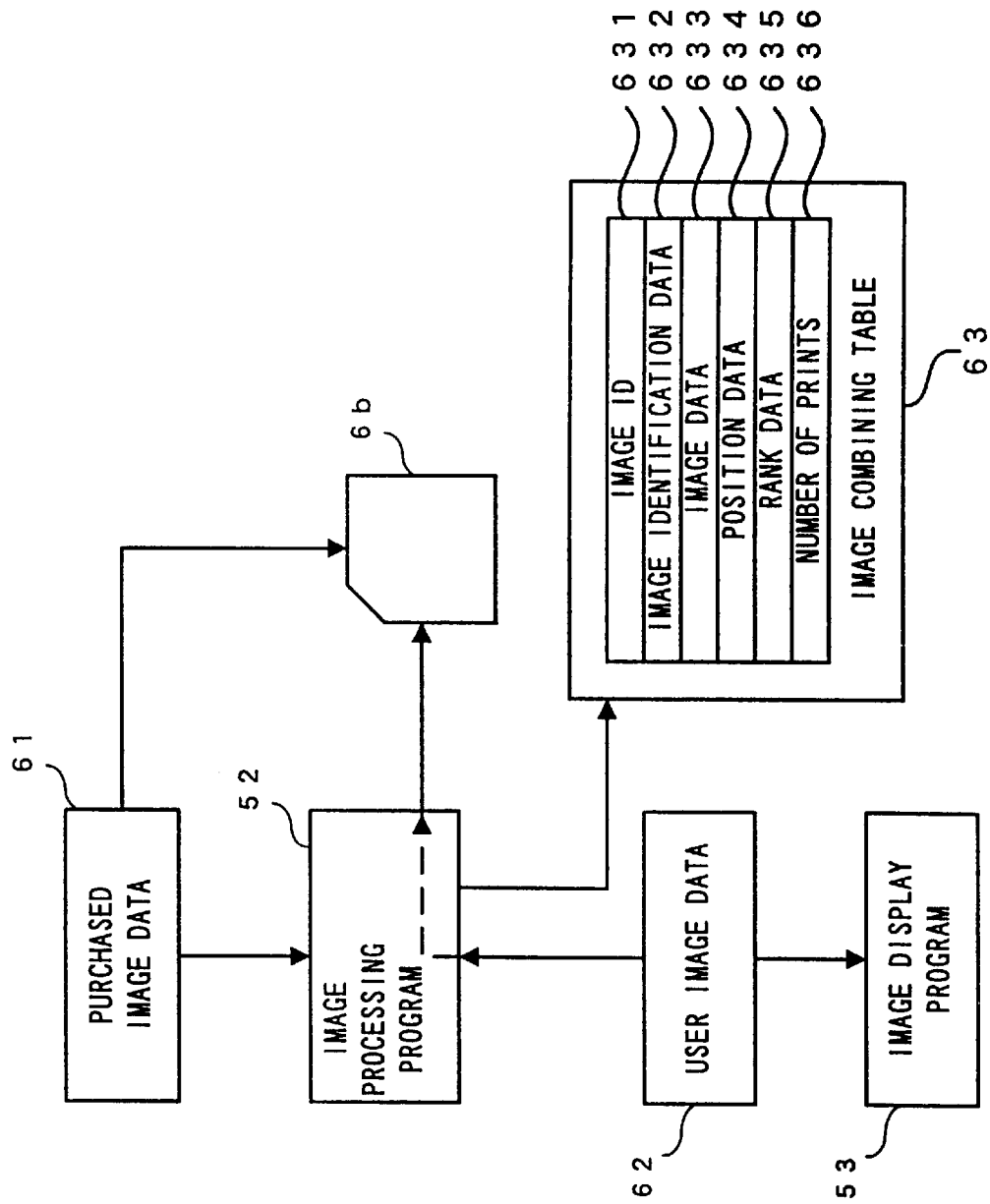
FIG. 2 is a block diagram illustrating the logical structure of the contents processing system according to the first embodiment of this invention.

Embodiments of this invention will now be described in detail.

First Embodiment

FIG. 1 illustrates the physical structure of an electrophotographic system according to the first embodiment of this invention.

As illustrated, this electrophotographic system comprises a ROM (Read Only Memory) cassette 1, an image processing device 2, a floppy disk device 3, a display device 4 and a print service center 5.

The ROM cassette 1, which forms a contents processing control device, has a first slot 11, a second slot 12, a decryption LSI (Large Scale Integrated Circuit) 13, an interface circuit 14 and a ROM 15, as shown in FIG. 1.

As illustrated, the first slot 11 and the second slot 12 are connected to the interface circuit 14, while the decryption LSI 13, the interface circuit 14 and the ROM 15 are connected to a control section 21 of the image processing device 2 via a parallel bus.

The first slot 11 and the second slot 12 correspond to second and third medium mounting means, and carries out second and third medium mounting steps. A recording medium 6a and a recording medium 6b are mounted in the first slot 11 and the second slot 12.

The recording medium 6b may be mounted in the first slot 11, and the recording medium 6a may be mounted in the second slot 12. In this case, the first slot 11 corresponds to the third medium mounting means and carries out the third medium mounting step, whereas the second slot 11 corresponds to the second medium mounting means and carries out the second medium mounting step.

The recording mediums 6a and 6b correspond to second and third recording mediums and storage means. They comprise smart media or the like which are the recording mediums used to record image data representing images photographed by digital still cameras, for example.

User image data 62, which a user has created using a digital still camera or the like and which will be explained later, is stored in the recording medium 6a. Moreover, purchased image data 61, user image data 62 and an image combining table 63 which will be explained later, are also stored in the recording medium 6b. The recording medium 6b serves as a "delivery medium" for delivering the purchased image data 61, the user image data 62 and the image combining table 63, from the image processing device to the print service center 5.

The decryption LSI 13 corresponds to decryption means.

The decryption LSI 13, having a circuit for decrypting the encrypted purchased image data 61 which will be explained later, decrypts and supplies to the control section 21 of the image processing device 2 the purchased image data 61 provided from the control section 21, in accordance with instructions from the control section 21.

The interface circuit 14 reads out data from the recording mediums 6a and 6b mounted in the first slot 11 and the second slot 12, and writes data into the recording mediums 6a and 6b.

The ROM 15 contains an image processing program 52 and an image display program 53 stored therein and which will be explained later, and supplies the stored image processing program 52 to the control section 21, in response to an access by the control section 21 of the image processing device 2.

In addition, the ROM 15 carries out the function of control means, together with the interface circuit 14.

The image processing device 2, which comprises a game computer such as NINTENDO 64 produced by NINTENDO, for example, has the control section 21, an input section 22, a storage section 23 and a slot 24, and are connected to the floppy disk device 3 and the display device 4. In addition, the image processing device 2 does not have a print function (the function of making hard copies of images, etc.).

The control section 21 comprises a CPU (Central Processing Unit), etc.

The control section 21 obtains an instruction input which designates image selection, arrangement, etc. from the input section 22. Next, in accordance with the instruction input, the control section 21 selects and inputs the purchased image data 61 from a floppy disk 7 mounted in the floppy disk device 3. Furthermore, the control section 21 inputs the user image data 62 from the recording medium 6a mounted in the first slot 11 or the second slot 12, through the interface circuit 14 of the ROM cassette 1. Then, the control section 21 arbitrarily processes, edits and combines the obtained purchased image data 61 and the user image data 62 to create an arbitrary image, and displays the image on the display device 4.

Moreover, when instructions designating the printing of the created image and the number of prints are given from the input section 22, the control section 21 stores in the image combining table 63 an image ID 631, purchased image identification data 632, user image identification data 633, position data 634, rank data 635 and number-of-prints data 636 which will be explained later. Then, the control section 21 outputs the purchased image data 61, the user image data 62 and the image combining table 63 to the recording medium 6b mounted in the first slot 11 or the second slot 12, through the interface circuit 14 of the ROM cassette 1.

The input section 22 comprises a keypad, a cross controller, etc., and outputs the aforementioned instruction input to the control section 21 in accordance with an operator's manipulation.

The storage section 23 stores the image processing program 53 read out from the ROM 15 of the ROM cassette 1, and is used as a work area for the control section 21.

The floppy disk device 3 includes first medium mounting means and carries out a first medium mounting step.

The floppy disk device 3 is connected to the control section 21 of the image processing device 2, and has a slot in which the floppy disk 7 is detachably mounted. And the floppy disk device 3 reads the contents of the purchased image data 61, etc. stored in the floppy disk 7 mounted in the slot, and outputs them to the control section 21.

In addition, the floppy disk 7 corresponds to storage means and a first recording medium, and stores the purchased image data 61 as encrypted.

The display device 4 comprises a TV (television receiver), etc., and is connected to the control section 21 of the image processing device 2. The display device 4 displays instructions to a user, a menu, an image created by the user and so on, in accordance with the control of the control section 21.

In addition, the display device 4 carries out the function of combination result output means, together with the control section 21.

The print service center 5 corresponds to output means, printing means, designated number printing means, and combination result output means.

The print service center 5 is arranged, for example, in a camera shop, a DPE shop or the like. The print service center 5, to which the aforementioned image combining table 63 has been input, resynthesizes and develops the original image into data in a bit-mapped font in accordance with the information contained in the image combining table 63, and prints the image which the data in the bit-mapped font represents.

Furthermore, this system logically comprises the image processing program 52, the image display program 53, the purchased image data 61, the user image data 62 and the image combining table 63, as illustrated in FIG. 2.

The image processing program 52, stored in the ROM 15 of the ROM cassette 1 and which is read and executed by the control section 21 of the image processing device 2, determines images to be used in processing and editing, determines the arrangement of the images and creates the image combining table 63 which defines the created image.

The control section 21, which executes the image processing program 52, corresponds to selection means, first and second selection means and combining means, and carries out first and second selection steps and a combining step. Further, the control section 21, which executes the image processing program 52, performs the functions of recording means, combination result output means and a recording step, together with the interface circuit 14 of the ROM cassette 1.

The image display program 53, stored in the ROM 15 of the ROM cassette 1 and which is read by the control section 21 of the image processing device 2 and is executed by the control section 21 and the display device 4, displays the image while in a creation process, as well as the image combining table 63, etc.

The purchased image data 61 and the user image data 62 are image data used to combine and print images, and has a data structure according to a predetermined format (JPEG format, for example).

The purchased image data 61 is protected by a portrait right, a copyright or the like, and is stored in the floppy disk 7 with the approval and acceptance of the proprietor of the right.

The purchased image data 61, stored in the floppy disk 7, has been encrypted in advance by a predetermined technique. The encrypted purchased image data 61 is decrypted by the encryption LSI 13.

The user image data 62 represents, for example, an image which the user has photographed with a digital still camera or a video camera, an image read by an image reader, an image which the user has created by himself/herself with the drawing software or the like of a personal computer, an image without a right such as a copyright, etc. The user image data 62 is stored in the recording medium 6a in advance by a digital still camera or the like in accordance with a user's manipulation, for example, and is used by the image processing device 2.

The image combining table 63, which stores data representing a synthesized image to be printed and which the control section 21 has created by the process of the image processing program 52, is stored in the recording medium 6b.

The image combining table 63 contains the image ID (Identification) 631, the purchased image identification data 632, the user image identification data 633, the position data 634, the rank data 635 and the number-of-prints data 636.

The image ID 631 includes the number and name (the image name, the file name) of an image created by the image processing device 2, etc.

Of the encrypted purchased image data 61, the purchased image identification data 632 forms part of the created image.

Of the user image data 62, the user image identification data 633 forms part of the created image.

The position data 634 and the rank data 635, which are data specifying the mode of processing and editing original images, form mode data.

The position data 634 is data showing a positional relationship between the images used in the image creation (combining). The position data 634 includes, for example, a data set (x, y) which specifies the amounts by which the images are to be moved vertically and horizontally from print positions (initial positions) peculiar to the respective images (x is the amount by which the images are to be moved horizontally, while y is the amount by which the images are to be moved vertically).

The rank data 635 is data showing which image data is to be printed in the case where a plurality of images overlap each other in a synthesized image. The rank data 635 contains such numbers that the smaller number, the higher rank, provided that the highest rank is 1, for example. And an image having the highest rank, i.e., an image having the smallest number assigned thereto, is printed in the area where the plurality of images in the synthesized image overlap each other. In addition, the images may be combined employing a layered structure. In this case, the rank data 635 contain layer numbers.

Figure 3:
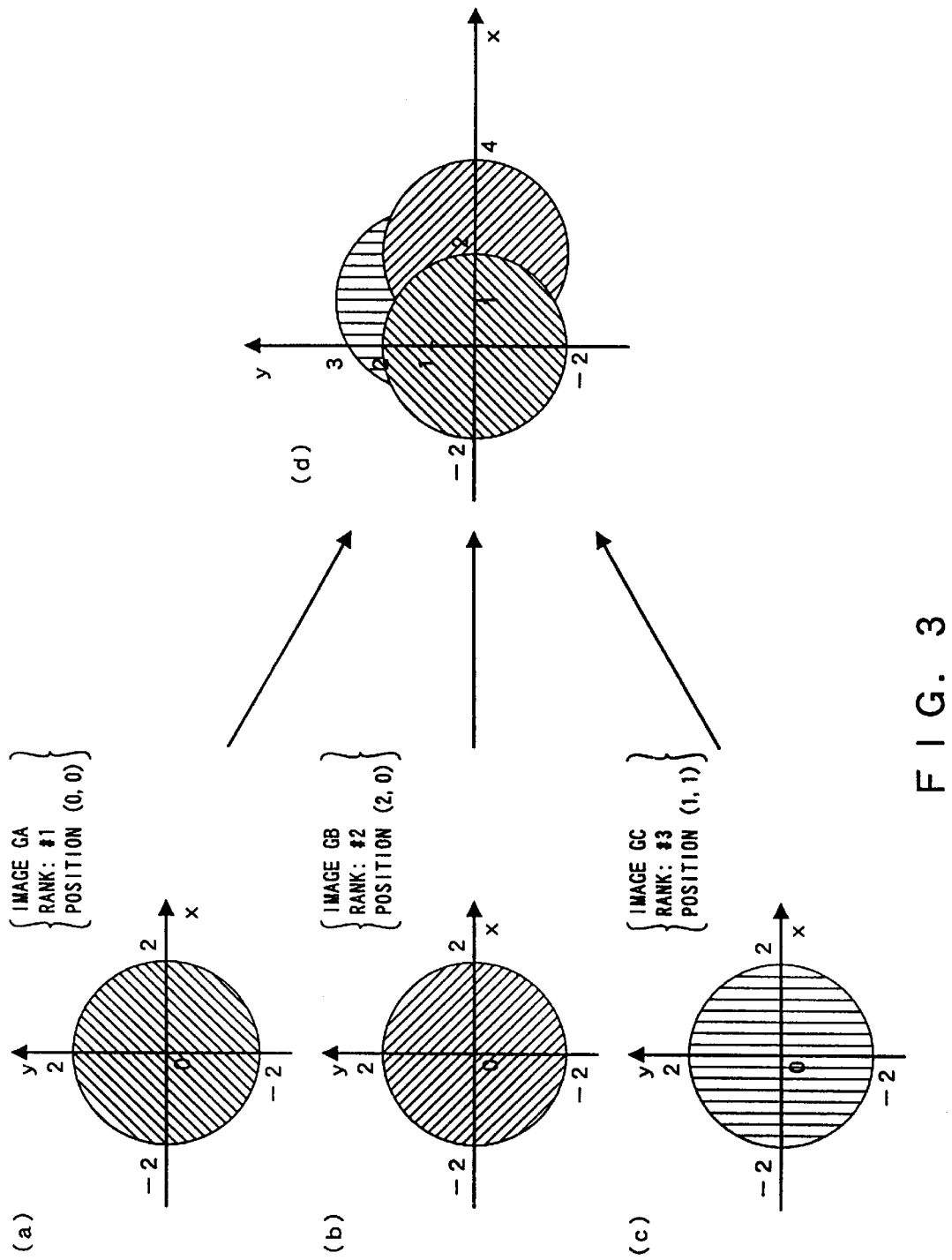
FIG. 3 is a diagram showing an image combining method and an example of mode data.

The position data 634 and the rank data 635 are reflected on the synthesized image as illustrated in FIG. 3, for example.

As shown in FIGS. 3(a) to (c), (0, 0), (2, 0) and (1, 1) as the position data 634 are assigned respectively to images GA, GB and GC which are circles having a radius of 2, while #1, #2 and #3 as the rank data 635 are assigned to the respective images.

The displayed result of combination of those images GA, GB and GC is as illustrated in FIG. 3(d). That is, the images are superposed on one another with each image being deviated by the amount which the position data 634 specifies, and are displayed so that one image having a lower rank is hidden behind another image having a higher rank.

Next, the operation of this electrophotographic system will now be explained.

Summary

First of all, the operation of the entire system will be summarized.

Firstly, the user purchases the floppy disk 7 in which has been stored the purchased image data 61 representing purchased images such as star's photographs, the images of popular characters, etc., and the user sets the floppy disk 7 in the floppy disk device 3.

Meanwhile, the user stores, in the recording medium 6b, the user image data 62 including image data such as snapshots of the user himself/herself which the user has photographed by himself/herself with a digital still camera or the like, and the user sets the recording medium 6b in the first slot 11 of the ROM cassette 1.

Next, the user activates the image processing program 52 by operating the input section 22 of the image processing device 2, and selects an arbitrary one (here the image illustrated in FIG. 4(A)) of the purchased images. Then, the user selects an arbitrary one (here the image illustrated in FIG. 4(B)) of the images which the user has created by himself/herself.

Subsequently, the control section 21 of the image processing device 2, which executes the image processing program 52, combines those images selected by the user, while adjusting the positions and overlapping of the images, and further the control section 21 synthesizes the appropriate frame to create the image illustrated in FIG. 4(C), for example.

The display device 4 displays the creation process and the created image.

Even in the case where the user who has finished his/her favorite image desires to print it, the user cannot print the image directly and needs to ask the DPE shop, having the print service center 5 arranged therein, to print the image.

In this case, by using the input section 22, the user gives the instruction to print the finished image, and inputs the number of prints. In response to this instruction, the control section 21, which executes the image processing program 52, stores in the recording medium 6b the image combining table 63 representing the aforementioned image.

The user brings the recording medium 6b to the DPE shop comprising the print service center 5.

In the DPE shop, the print service center 5 reads out the image combining table 63 from the recording medium 6b, combines the purchased image data 61 and the user image data 62 on the basis of the user image data 62, the position data 634 and the rank data 635 which are contained in the image combining table 63, and reconstructs the image created by the user. The print service center 5 prints the reconstructed image by the number which the number data designates. The image(s) as printed is handed to the user by a clerk or the like of the DPE shop, upon payment of a royalty for the image, for example.

According to this electrophotographic system, the user who has purchased an image can freely process and edit the image on a screen, and can enjoy creating such an image as that illustrated in FIG. 4(C). Meanwhile, the printing of the created image is performed by the DPE shop or the like, and the user receives the printed image in exchange for the worth of the image, for example.

Thus, according to this system, the proprietor's right can be assuredly protected while satisfying the users desire to process and edit an image, and harmony can be established between the use and protection of digital contents or multimedia contents.

Image Combining and Printing Instructions

Next, the operation of this electrophotographic system will now be explained in detail, with reference to FIGS. 5 and 6.

In the case where the user desires to perform image combining by using a purchased image, he/she switches on the image processing device 2 after mounting the ROM cassette 1 in the image processing device 2. After the switching on, the control section 21 of the image processing device 2 loads the image processing program 52 from the ROM 15 of the ROM cassette 1 and stores it in the storage section 23.

And the floppy disk 7 is mounted in the floppy disk device 3, the recording medium 6a is mounted in the first slot 11, and the instruction to make the control section 21 execute the image processing program 52 is input through the input section 22.

Figure 5:
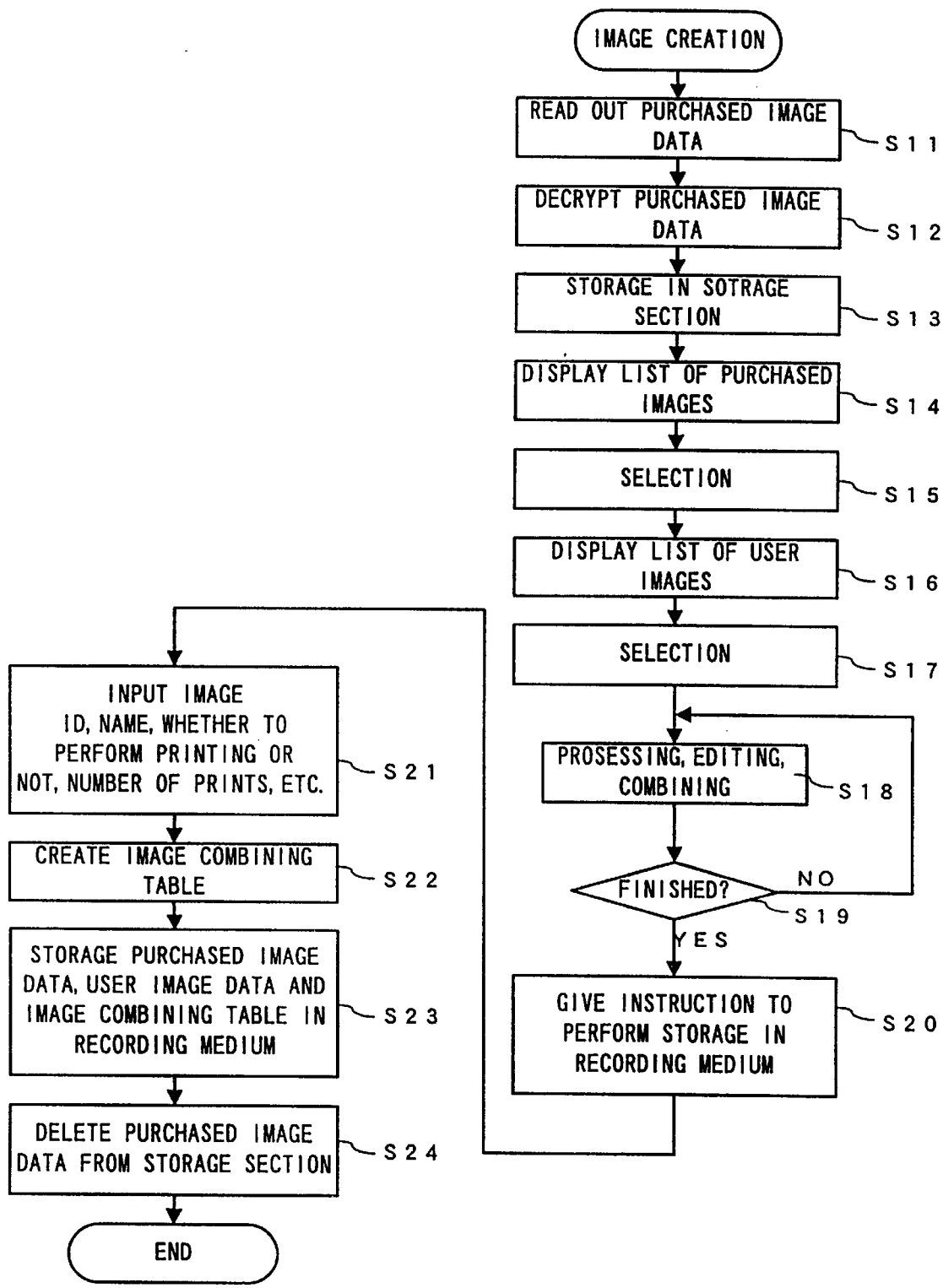
FIG. 5 is a flowchart for explaining the operation of an image processing device.

In response to this instruction, the control section 21 accesses the image processing program 52 stored in the storage section 23, and executes the process of the image processing program 52 which is shown in FIG. 5. When the process is started, the control section 21 performs the procedures for selecting the images to be used in combining.

Firstly, the control section 21 accesses the floppy disk 7 via the floppy disk device 3, reads out and transfer the encrypted purchased image data 61 (for example, images in stars photographs as recorded) stored in the floppy disk 7 to the decryption LSI 13, and moreover stores the data in the storage section 23 (a step S11).

The decryption LSI 13 decrypts the encrypted purchased image data 61 transferred from the control section 21, and then returns it to the control section 21 (a step S12). The control section 21 stores the purchased image data 61 returned by the step S12 in the storage section 23 (a step S13).

The control section 21 displays, on the display device 4, a list of purchased image data 61 returned from the decryption LSI 13 and stored in the storage section 23, as a list of star's photographs (step S14).

The user manipulates the input section 22, thereby selecting an arbitrary image from the displayed list of star's photographs (step S15). The selection result is reported to the control section 21 via the input section 22. In addition, the user can select a plurality of purchased images.

Next, the control section 21 accesses the recording medium 6a via the interface circuit 14 of the ROM cassette 1, and designates the user image data 62 (for example, images in the snapshots which the user has photographed by himself/herself) stored in the recording medium 6a. Then, the control section 21 displays, on the display device 4, a list of the designated user image data 62 (a step S16).

The user selects an arbitrary image from the displayed list of snapshots in the same manner as the step S15, and the selection result is reported to the control section 21 via the input section 22 (step S17). In addition, the user can select a plurality of user images.

Next, the control section 21 processes, edits and combines the images in accordance with instructions which the user gives using the input section 22 (a step S18). That is, the control section 21 adjusts the positions and ranks of the individual images selected by the user, and combines the images into an arbitrary one.

Incidentally, the adjustment of the positions and ranks has been exemplified as the content of the combining. However, the images can be processed, edited and combined by using a variety of known techniques. For example, the individual images are processed by way of, for example, rotating the images, varying the brightness of the images, bringing the images into soft focus and so on. In this case, as regards the purchased images, the image data in the storage section 23 is processed in accordance with the content of an instruction, and the content of the processing is registered as part of the mode data. As regards the user images, on the other hand, they are processed based on an instruction. Further, the mode data may be registered also as regards the user images.

In addition, in the case where the control section 21 performs the processing and editing of the images, the control section 21 carries out the function of editing means.

And the control section 21 determines whether the user has given the instruction to finish the processing, editing and combining of the images, by using the input section 22, (a step S19). When the control section 21 determines that the user has not yet given the instruction, the control section 21 returns the process to the step S18, whereas when the control section 21 determines that the user has given the instruction, the control section 21 advances the process to a step S20.

In the above-described manner, the user can have the pleasure of arbitrarily processing and altering the purchased images on the screen.

When the user desires to print a processed, edited and synthesized image, he/she gives the instruction to perform a registration in the recording medium 6b (a step S20).

In response to this instruction, the control section 21 opens a dialog box on the display device 4, and the ID and name of the created image, the instruction as to whether to effect printing or not, the number of prints, etc. are input thereto (a step S21).

With this operation, the control section 21 creates the image combining table 63, based on the input data and the data registered in the storage section 23 (a step S22). An example of the image combining table 63 is shown in FIG. 6.

And the control section 21 stores the created image combining table 63 in the recording medium 6b, via the interface circuit 14 of the ROM cassette 1. Furthermore, the control section 21 also stores, in the recording medium 6b, the purchased image data 61 and the user image data 62 specified by the purchased image identification data 632 and the user image identification data 633 contained in the image combining table 63 (a step S23). In the case of storing the purchased image data 61 in the recording medium 6b, however, the encrypted purchased image data 61 stored in the storage section 23 is stored in the recording medium 6b.

Thereafter, the control section 21 deletes the purchased image data 61 (both the encrypted one and the decrypted one) stored in the storage section 23 (a step S24), and terminates the image combining process.

After that, this electrophotographic system returns to the usual processing.

In addition, the structure of this electrophotographic system is not limited to that described above.

For example, in the electrophotographic system explained above, the purchased image data 61, the user image data 62 and the image combining table 63 are stored in the recording medium 6a and the recording medium 6b which is a recording medium independent from the floppy disk 7.

However, the purchased image data 61, the user image table 62 and the image combining table 63 may be stored in the same recording medium, and the purchased image data 61 and the image combining table 63, for example, may be stored in the recording medium 6a in which the user image data 62 has already been stored. If this is done, the procedure by which the control section 21 stores the user image data 62 in the recording medium can omitted.

In this case, the control section 21 carries out the function of encrypted contents recording means.

Furthermore, the purchased image data 61 is not necessarily stored in the floppy disk 7, and may be pre-stored in the recording medium 6b, for example, or may be stored in another recording medium which has substantially the same structure as that of the recording medium 6a and that of the recording medium 6b. In those cases, the floppy disk device 3 are unnecessary.

Moreover, the purchased image data 61 is not necessarily stored in the recording medium 6b, and the print service center 5 may include the purchased image data pre-stored therein and which is substantially the same as the purchased image data 61 stored in the floppy disk 7.

Further, the purchased image data 61 can be distributed from an external management center or the like to the print service center 5 across a network or the like.

Moreover, the floppy disk device 3 may comprise a unit which causes an interruption in the processing of the control section 21 upon detection of the mounting of the floppy disk 7, and the control section 21 may execute the process of the image processing program 52 as an interruption process when the interruption occurs.

Moreover, the image combining table 63 is not necessarily a file which is independent from the user image data 62, and the contents of the image combining table 63 may be described in the header part of the user image data 62.

In addition, there is a risk that a person, having some knowledge of the data processing, may make bad use of the purchased images stored in the floppy disk 7 and the recording medium 6b.

In this case, it is preferred that the floppy disk 7 and the recording medium 6b be cartridges of unique shape having no compatibility with others and furthermore be formed having a tamper-free structure.

Furthermore, let it be assumed that the ROM cassette 1, the recording medium 6a and the recording medium 6b are all plate-shaped, and that the mounting and removal of the ROM cassette 1 in and from the image processing device 2 are performed in directions substantially perpendicular to the thickness direction of the ROM cassette 1, as illustrated in FIG. 7.

In this case, the mounting and removal of the recording medium 6a and the recording medium 6b in and from the first slot 11 and the second slot 11 may be performed in substantially the same directions as those of the mounting and removal of the ROM cassette 1 in and from the image processing device 2, and the recording medium 6a and the recording medium 6b may have such a structure as to be substantially parallel with the ROM cassette 1 when they are mounted in the ROM cassette 1.

If the first slot 11 and the second slot 12 have such a shape, the recording mediums 6a and 6b do not become the state in which they project in the thickness direction of the ROM cassette 1 when they are mounted in the ROM cassette 1. By virtue of this, the detachment of the recording mediums 6a and 6b from the ROM cassette 1 and a damage to the recording mediums 6a and 6b due to a physical impact or the like can be prevented.

Moreover, the ROM cassette 1 may have such a shape that when the recording mediums 6a and 6b are mounted in the ROM cassette 1, the level of the top of the ROM cassette 1 from the bottom of the image processing device 2 is equal to or greater than that of the tops of the recording mediums 6a and 6b.

In the case where the ROM cassette 1 has such a shape, the recording mediums 6a and 6b mounted in the ROM cassette 1 do not project upwardly from the top of the ROM cassette 1, and the detachment of the recording mediums 6a and 6b from the ROM cassette 1 and a damage to the recording mediums 6a and 6b due to a physical impact or the like can be prevented.

Furthermore, information specifying an image printing mode may be stored in the image combining table 63.

For example, giving the instruction to print an image, created with the image processing device 2, on each of seal pieces arranged in matrix form over a seal sheet, as well as printing the image on an enlarged scale over the single seal sheet, may be set possible, and these specifications may be contained in the image combining table 63.

Second Embodiment

Figure 8:
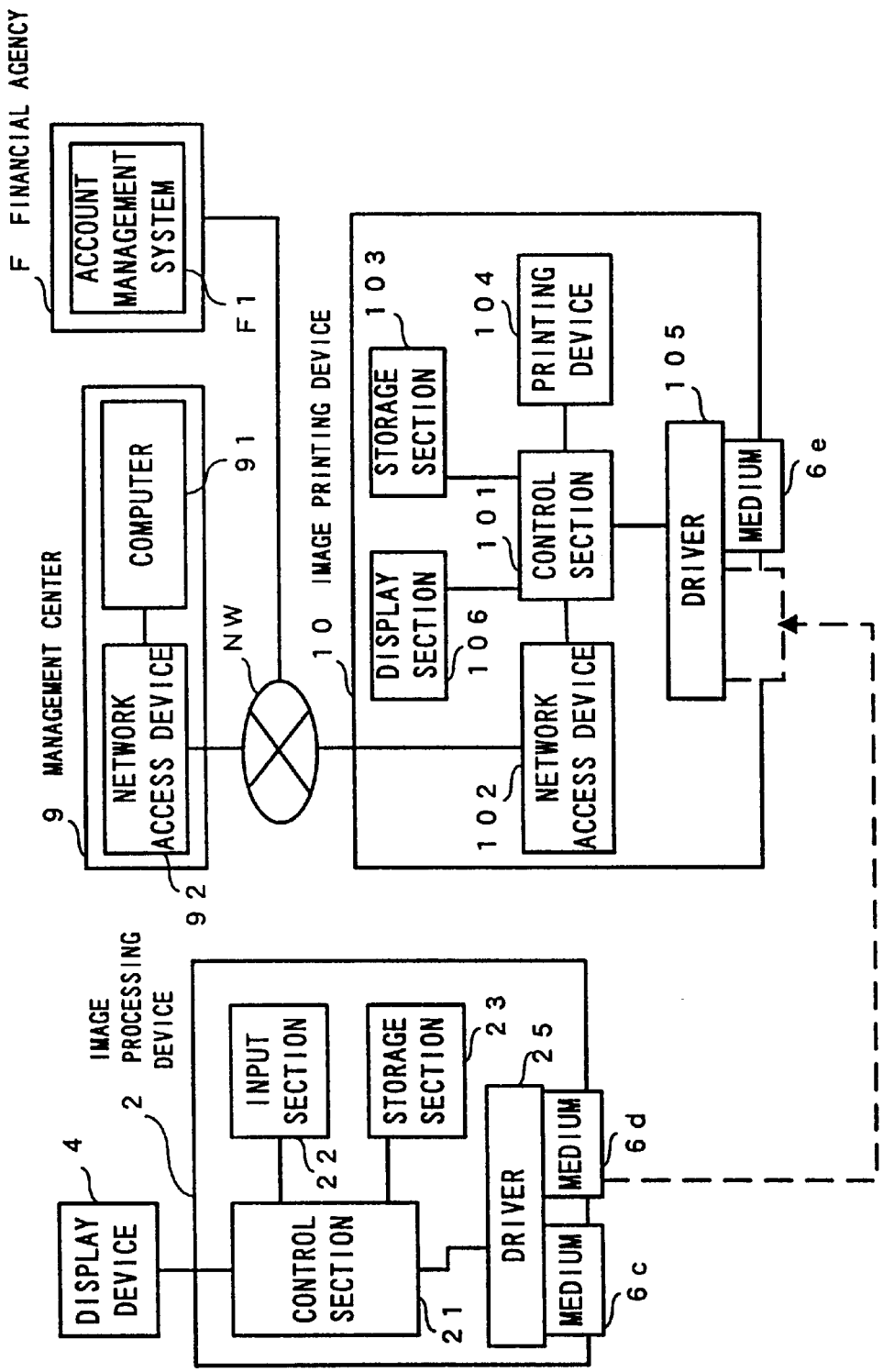
FIG. 8 is a block diagram illustrating the basic structure of a contents protection system according to the second embodiment of this invention.

FIG. 8 illustrates the physical structure of an image combining and charging system according to the second embodiment of this invention.

As illustrated, this image combining and charging system comprises a management center 9, an image printer 10, an image processing device 2 and a financial agency F.

The image processing device 2, arranged in each home or the like and comprising a computer, etc. such as a game computer without the print function (the function of making hard copies of images, etc.), comprises a control section 21, an input section 22, a storage section 23 and a recording medium driver 25, and is connected to a display device 4. In addition, the control section 21, the input section 22 and the storage section 23 may be substantially the same in structure as those of the first embodiment.

An instruction input which designates image selection, arrangement, etc. is input to the control section 21 from the input section 22. In accordance with this instruction input, the control section 21 selects and inputs the purchased image data from a recording medium 6c mounted in the recording medium driver 25, inputs the user image data from a recording medium 6d, processes, edits, combines the image data to create an arbitrary image, and displays the image on the display device 4.

Moreover, when instructions concerning the printing of the created image and the number of prints are given from the input section 22, the control section 21 stores, in an image combining table, the image identification data of the purchased image forming the created image, position data and rank data defining the arrangement of the purchased image and the user image, the number of prints, etc., and outputs them to the recording medium 6d mounted in the recording medium driver 25.

The input section 22 outputs the aforementioned instruction input to the control section 21 in accordance with an operator's manipulation.

The storage section 23 stores an operation program, and functions as a work area at the time of image creation and so on.

The recording medium driver 25 has first and second slots in which are detachably mounted the recording mediums 6c and 6d comprising a flash memory, a ROM (Read Only Memory) cartridge, etc., reads and outputs the record contents of the recording mediums 6c and 6d to the control section 21, and records the image combining table in the recording medium 6d.

The display device 4 is substantially identical with that of the first embodiment, and displays instructions to the user, a menu, an image created by the user and so on, under the control of the control section 21.

In addition, the display device 4 carries out the function of combination result output means, together with the control section 21.

The management center 9 is arranged, for example, in a public agency established for this system or a third party's agency or the like, and comprises a computer 91 and a network access device 92.

The computer 91 is connected to an image printing device 10 and a financial agency F via the network access device 92 which comprises a modem, a terminal adapter, etc. and via a network NW.

Image identification data and number data which will be described later and shop identification data are input to the computer 91 from the image printing device 10, and furthermore the computer 91 reports printing allowance to the image printing device 10.

Moreover, the computer 91 communicates with the financial agency F, charges a royalty for images (contents) against a shop, and pays a predetermined amount of money into an account of an proprietor (a copyright proprietor, a portrait right proprietor or the like).

The image printing device 10 is arranged, for example, in a camera shop, a DPE shop or the like, and comprises a control section 101, a network access device 102, a storage section 103, a printing device 104, a recording medium driver 105 and a display section 106.

The control section 101 is connected to the computer 91 of the management center 9 via the network access device 102.

The aforementioned image combining table is input to the control section 101 from the recording medium 6d mounted in the first slot of the recording medium driver 105. And the control section 101 fetches information contained in the image combining table, reads out an image (protection target contents) protected by a copyright or the like from the recording medium 6e mounted in the second slot, resynthesizes and develops the original image into data in a bit-mapped font in accordance with the image combining table.

Furthermore, the control section 101 reports the use of the image to the computer 91, and prints the reconstructed image with the printing device 104 when the control section 101 receives a report of allowance.

The storage section 103 stores the operation program for the control section 101, and functions as a work area when the control section 101 resynthesizes the image.

The printing device 104 prints the bit-mapped image in accordance with the instructions of the control section 101.

The storage medium driver 105 has the first and second slots in which are detachably mounted the recording mediums 6d and 6e comprising a flash memory, a ROM (Read Only Memory) cartridge, etc., reads their record contents and outputs them to the control section 101.

The display section 106 displays instructions to the operator, the image combining table, charging information and the image to be printed, etc.

The financial agency F comprises, for example, one or more banks with an account management system F1, and transfers money between accounts.

The recording mediums 6c to 6e comprise a flash memory, a ROM cartridge, etc.

The recording mediums 6c and 6e store images protected by a copyright, a portrait right or the like, i.e., a plurality of substantially identical images, the printing of which requires payment of the worth. The images may be encrypted ones.

Images, which the user has created with a digital still camera, an image scanner or the like, are stored in the recording medium 6d. The aforementioned image combining table is also stored therein. The recording medium 6d serves as a "delivery medium" for delivering the image combining table from the image processing device 2 to the image printing device.

Figure 9:
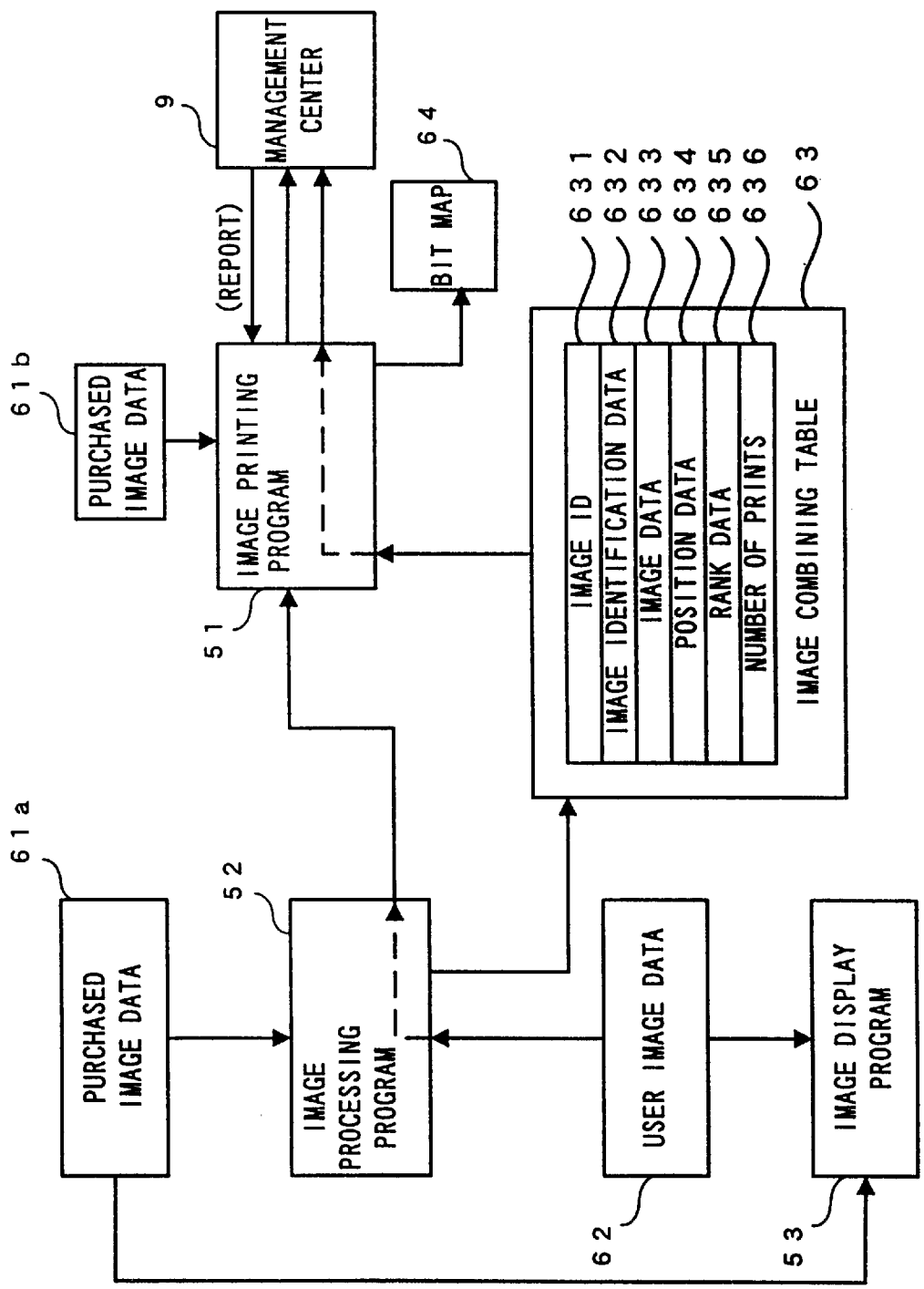
FIG. 9 is a block diagram illustrating the logical structure of the contents protection system according to the second embodiment of this invention.

Furthermore, this system logically comprises an image printing program 51, purchased image data 61a, 61b and a bit map 64, in addition to the user image data 62, the image combining table 63, the image processing program 52 and the image display program 53, as illustrated in FIG. 9.

The image printing program 51, which is executed by the control section 101 of the image printing device 10, inputs the image combining table 63, reports the use of the purchased image data to the management center 9, reads out the purchased image data 61b in accordance with the image combining table 63, resynthesizes the original image (the image which the user has created with the image processing device 2), develops the image into the bit map 64 and performs printing.

In this image combining and charging system, the image processing program 52, which is executed by the control section 21 of the image processing device 2, determines images to be used in processing and editing, determines the arrangement of the images and creates the image combining table 63 which defines the created image.

Furthermore, in this image combining and charging system, the image display program 53, which is executed by the control section 21 of the image processing device 2 and the display device 4, displays the image while in the creation process, as well as the image combining table 63, etc.

The purchased image data 61a and 61b are substantially identical with the purchased image data 61 of the first embodiment, while the user image data 62 and the image combining table 63 are substantially identical with those of the first embodiment.

However, the purchased image data 61a and 61b are identical with each other, and are protected by a portrait right, a copyright or the like, and are stored in the recording mediums 6c and 6e with an proprietor's approval and acceptance. Meanwhile, the user image data 62 is pre-stored in the recording medium 6d, and is used by the image processing device 2. Moreover, the image ID 631 stored in the image combining table 63 includes the number, name (the image name, the file name), etc. of the image created by the image processing device 2.

In addition, the image combining table 63 does not contain the purchased image data 61a itself. Accordingly, the purchased image data 61a is not stored in the recording medium 6d.

Next, the operation of the image combining and charging system thus structured will be explained.

Summary

First of all, the user purchases the recording medium 6c containing the purchased image data 61a pre-stored therein, and sets the recording medium 6c in the first slot of the recording medium driver 25 of the image processing device 2. Meanwhile, the user stores the user image data 62 in the recording medium 6d, and sets the recording medium 6d in the second slot of the recording medium driver 25.

Then, the user activates the image processing program 52 by operating the input section 22, and selects an arbitrary one (for example, the image shown n FIG. 4(A)) of the purchased images. Next, the user selects an arbitrary one (for example, the image shown in FIG. 4(B)) of the images created by himself/herself.

Following the above, the user combines those images while adjusting their positions and overlapping. Furthermore, the user synthesizes the appropriate frame to create the image shown in FIG. 4(C), for example.

The display device 4 displays the creation process and the created image.

Even in the case where the user finishes his/her favorite image and wishes to print it, he/she cannot print it directly and has to request the DPE shop or the like, having the image printing device 10 arranged therein, to print the image.

In this case, the user issues a printing instruction from the input section 22, and inputs the number of prints. In response to this instruction, the control section 21 and the image processing program 52 store the image combining table of the image in the recording medium 6d. At that time, the control section 21 does not store the purchased image data 61a itself in the recording medium 6d.

Next, the user brings the recording medium 6d to the DPE shop or the like comprising the image printing device 10. A clerk of the DPE shop sets the recording medium 6d in the first slot of the recording medium driver 105.

The control section 101 reads out the image combining table from the set medium, specifies the purchased image data forming the image to be printed, and reports the ID of the purchased image data 61a and the number of prints to the computer 91 via the network access device 102, the network NW and the network access device 92.

The computer 91 calculates a charge (a copyright royalty, a portrait right royalty or the like) from the unit price of the purchased image and the number of prints, and records the charge as one against the DPE shop. Furthermore, the computer 91 reports, to the control section 101, the information representing the right to use the image and the charge via the network access devices 92 and 102.

When the control section 101 receives the right to use, it reads out the purchased image data 61b from the recording medium 6e, reads out the user image data 62, the position data 634 and the rank data 635 from the recording medium 6d, combines the purchased image data 61b and the user image data 62 on the basis of the position data 634 and the rank data 635, and reconstructs the original image created by the user.

Then, using the printing device 104, the control section 101 prints the reconstructed image by the number which the number data designates. Moreover, the control section 101 outputs a printing charge to the display section 106, etc. This charge is the sum and particulars of the copyright or portrait right royalty, reported from the management center 9, and the DPE shop's fees, for example. Upon payment of the corresponding amount of money, a clerk of the DPE shop hands the printed image to the user.

In accordance with a report of use from each image printing device 10, the computer 91 sums royalties for images in association with each DPE shop and in units of months, for example, accesses the account management system F1 of the financial agency F, and draws the corresponding amount of money from the account of each DPE shop.

Meanwhile, in accordance with a report of use from each image printing device 10, the computer 91 sums royalties in association with each portrait right or copyright proprietor and in units of months, for example, accesses the account management system F1 of the financial agency F, and pays the corresponding amount of money into the proprietors' accounts.

According to this contents protection system, the user who has purchased an image can freely process and edit the image on the screen, and enjoy creating such an image as that illustrated in FIG. 4(C), for example. Meanwhile, when printing the created image, the user pays the a royalty for the image via the DPE shop. The royalty is remitted to the proprietor via the management center 9.

Thus, according to this system, the user's desire to process and edit the image is fully satisfied, while the worth can be assuredly paid to the proprietor, and harmony can be established between the use and protection of digital contents or multimedia contents.

Image Combining and Printing Instructions

Next, the operation of this image using and charging system will now be explained in detail, with reference to FIGS. 10 to 15.

When the user desires to combine images by using a purchased image, he/she inputs an instruction which designates an image combining process to the control section 21 through the input section 22.

Figure 10:
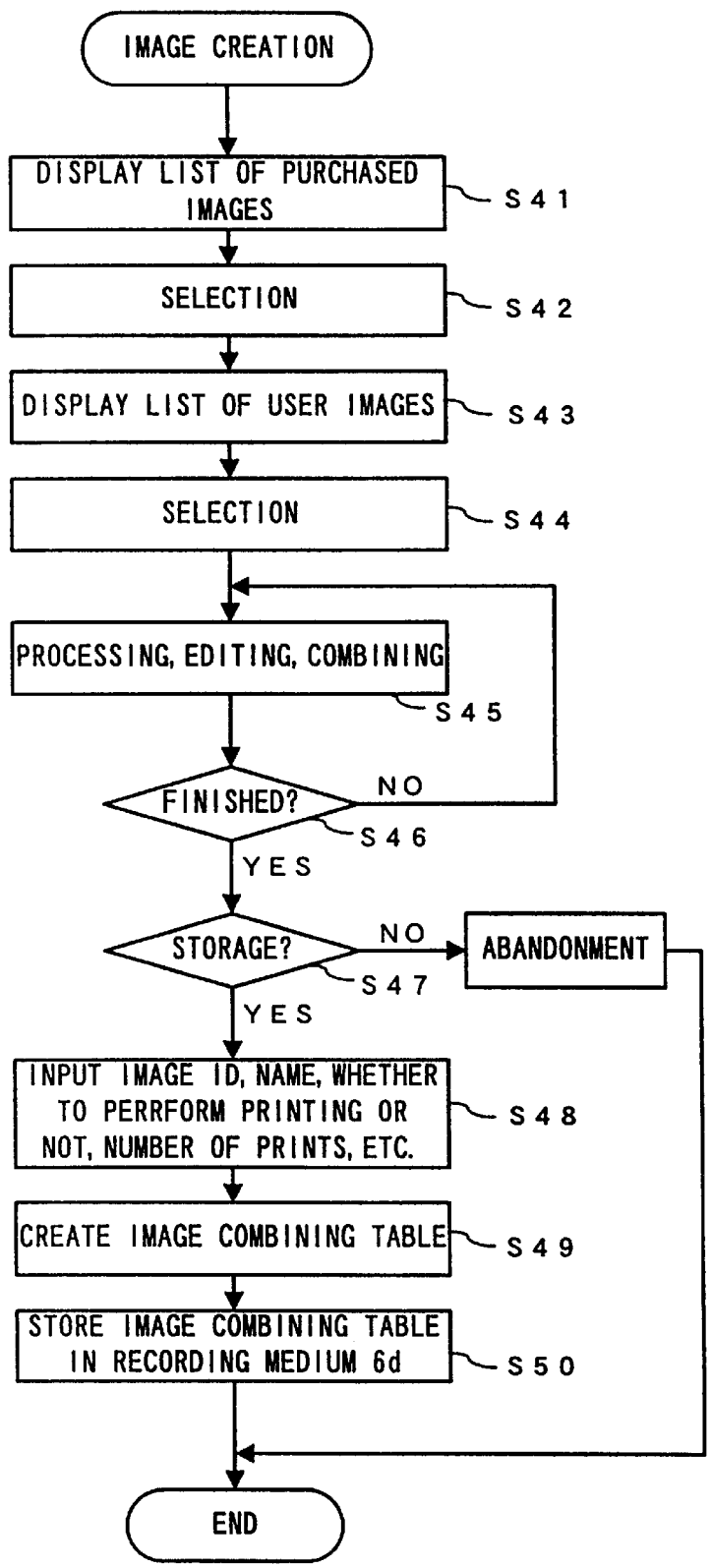
FIG. 10 is a flowchart for explaining the operation of the image processing device.

In response to this instruction, the control section 21 (the image processing program 52) initiates the process shown in FIG. 10, and starts the procedures for selecting the images to be used in combining.

First of all, the control section 21 displays, on the display section 4, a list of the purchased image data 61a (for example, a list of star's photographs as recorded) stored in the recording medium 6c (a step S41).

The user selects an arbitrary image from the displayed list of star's photographs (a step S42). The user can select a plurality of images.

Next, the user image to be used in combining is displayed and selected (steps S43 and S44).

Then, the user performs substantially the same operations as those performed in the step S18 of the first embodiment, thereby processing, editing and combining the images (steps S45 and S46).

In addition, in the case of processing the purchased image, the image data in the storage section 23 is processed, and the content of the processing is registered as part of the mode data.

In this manner, the user can have the pleasure of arbitrarily processing and altering the purchased images on the screen.

When the user desires to print the created image, he/she gives the instruction to perform a registration in the recording medium 6b (a step S47).

In response to this instruction, the control section 21 opens a dialog box on the display device 4, and the ID and name of the created image, the instruction as to whether to effect printing or not, the number of prints, etc. are input thereto (a step S48).

With this operation, the control section 21 creates the image combining table 63 on the basis of the input data and the data registered in the storage section 23 (a step S49), stores the table in the recording medium 6d (a step S50), and thereafter returns to the usual processing.

An example of the image combining table is shown in FIG. 11.

Image Printing

A method for printing the data thus combined and registered in the recording medium 6d will now be explained.

The user brings the recording medium 6d to a DPE shop or the like.

Figure 12:
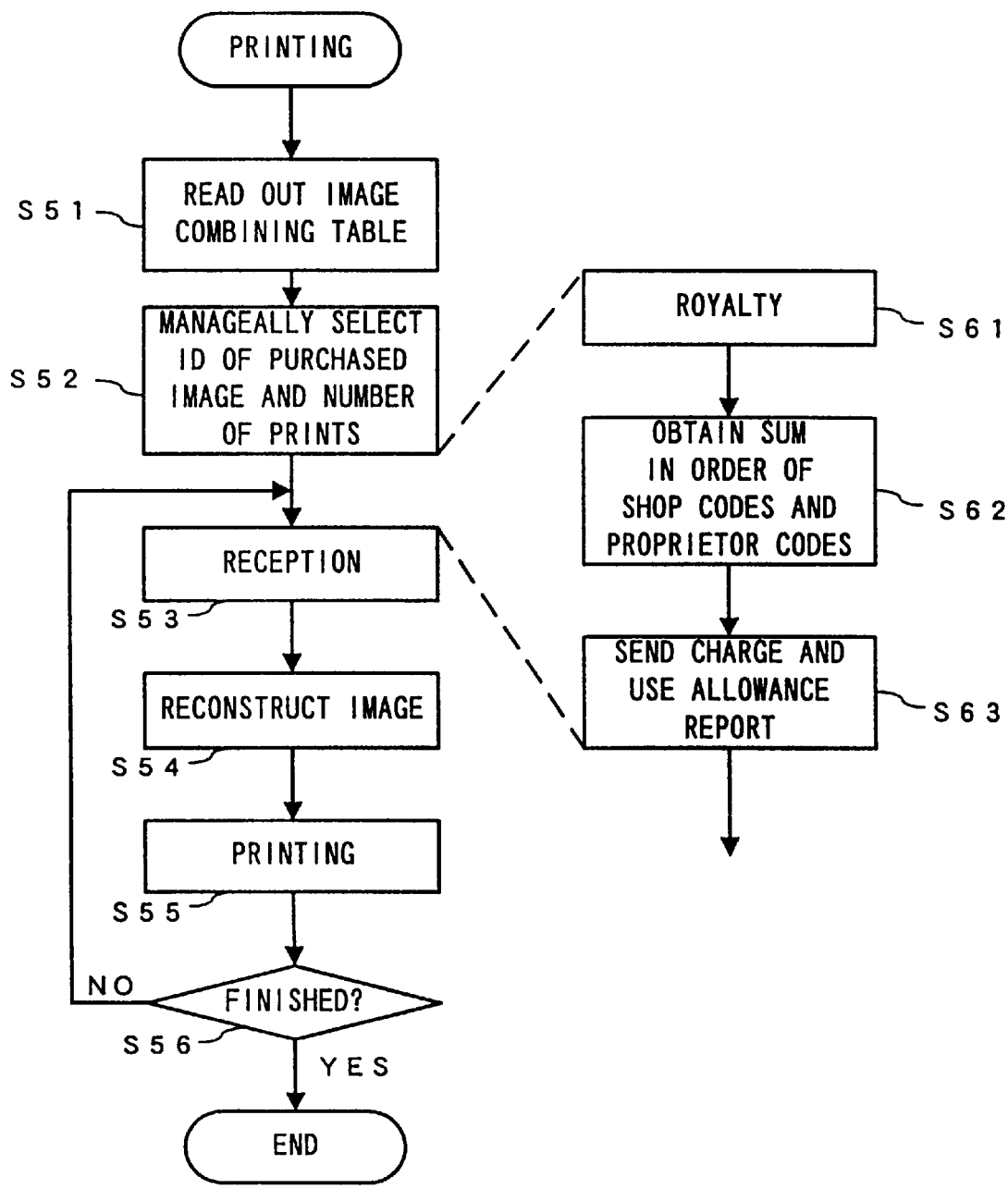
FIG. 12 is a flowchart showing the operation of an image printing device and a management center.

When the recording medium 6d is set in the recording medium driver 105, the control section 101 initiates the process shown in FIG. 12.

Firstly, the control section reads out the image combining table 63 stored in the recording medium 6d (a step S51) and sends to the management center 9 the ID of the purchased image to be printed, the number of prints, and the shop code assigned to the DPE shop (a step S52).

Upon receiving a report thereof, the computer 91 of the management center 9 calculates a charge for the use from a list of royalties stored in advance in the form of a list as shown in FIG. 13 (a step S61), and effects summing in association with each shop code and each proprietor code (a step S62). Thereafter, the charge for the use (including its particulars) and a use allowance report (a report of allowance of use) are sent to the image printing device 10 (a step S63).

The control section 101 receives the charge for the use and the allowance report (a step S53), reads out a purchased image from the recording medium 6e on the basis of synthesized data, and furthermore reconstructs the original image data created by the user, in accordance with the data stored in the image combining table 63 (a step S54).

Next, the printing device 104 is controlled to print the reconstructed image by the number which the image combining table 63 designates (a step S55).

Then, the control section 101 displays, on the display section 106, a charge which is the total of the charge reported from the management center 9 and self fees. Moreover, in the case where there is the next image to be printed, the control section 101 repeats the same operations as those mentioned above (steps S53 to S56). In addition, in the case where there are a plurality of images to be printed, all images to be printed may be simultaneously reported to the management center 9 (in this case, a return is made from the determination in the step S56 to the step S54).

The image(s) as printed is handed to the user in exchange for money.

Thus, on the precondition of paying the royalty, the user can print the image created using an image protected by the copyright or the like.

Based on the sum of royalties obtained in association with each shop ID, the sum of royalties obtained in association with each proprietor ID, etc., the computer 91 of the management center 9 accesses the account management system F1 of the financial agency F periodically, for example, at the end of every month or the like, draws the corresponding amount of money from the shops' accounts, and pays the corresponding amount of money into each of the proprietors' accounts.

The purchased images may be pre-stored in the storage section 103 of the image printing device 10 and the storage section 23 of the image processing device 2.

Furthermore, the purchased image data 61b may be distributed from the management center 9 to the image printing device 10 across the network NW.

The method by which the shops pay the royalties to the management center 9 and the mode in which the management center 9 pays the royalties to the individual proprietors are arbitrary and are not limited to the payment of money into accounts, and it is also possible to send and receive electronic money (an electronic representation of a monetary value). An example of the format of the electronic money (a transfer record) is shown in FIG. 14.

According to this electronic money, the initial monetary value (the amount of money when issued) of the electronic money, the amount of money as sent (some of the amount of money issued), the sending destination and the transfer date can be discriminated from the electronic money itself.

Furthermore, the management center 9 may be run using part of the royalties collected from the individual shops, for example.

In addition, there is a risk that a person, having some knowledge of the data processing, may make bad use of the purchased images stored in the recording mediums 6c and 6e.

In this case, it is preferred that the recording mediums 6c and 6e be cartridges (like those of game devices) of unique shape having no compatibility with others and furthermore be formed having a tamper-free structure.

Moreover, as regards the recording medium 6e, a decryption key may be contained in the report of allowance of use from the management center 9, and the purchased images may be decrypted and received using the decryption key which the control section 101 has received.

Figure 15:
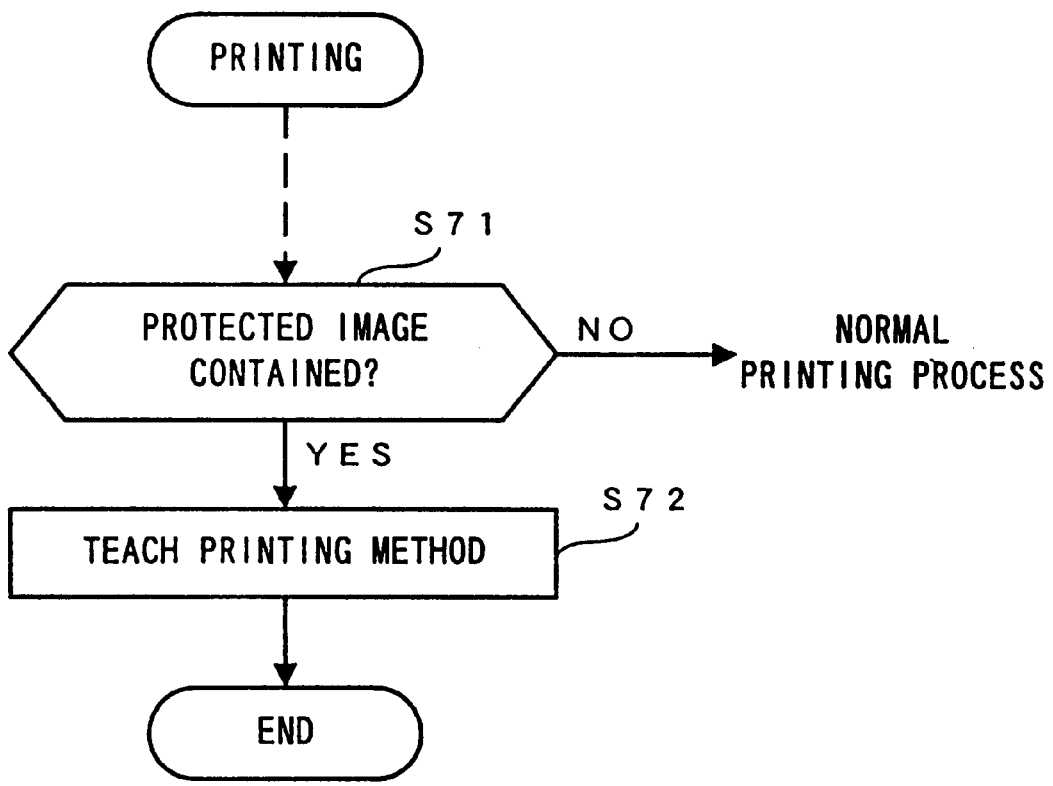
FIG. 15 is a flowchart showing a printing inhibiting process.

In addition, the image processing device 2 may have the print function. In this case, as illustrated in FIG. 15, it is preferred to provide the steps of determining whether an image protected by a copyright or the like is contained or not when a printing instruction is given to the printer driver (a step S71), displaying a message which teaches a printing method when it is determined that an image protected by a copyright or the like is contained (a step S72), and inhibiting printing by terminating processing.

By those steps, illicit printing can be prevented.

The printing mode may be designated and stored in the image combining table 63.

For example, giving the instruction to print an image created with the image processing device 2 on each of seal pieces arranged in matrix form over a seal sheet, as well as printing the image on an enlarged scale over the single seal sheet, may be set possible, and these specifications may be contained in the image combining table 63.

Furthermore, a program for performing the above-described processing, for example, the image processing program 52, may be stored in the recording medium 6c, together with the purchased image data 61a, and when the recording medium 6c is mounted in the recording medium driver 25, the mounting of the recording medium 6c may be detected by a sensor or the like so that an interruption to the control section 21 occurs and an image printing operation is performed automatically.

Moreover, the purchased image data 61a may be data encrypted using a predetermined technique.

In this case, the recording medium driver 25 has a decryption logic circuit 251 and an interface circuit 252 in addition to the first and second slots, as illustrated in FIG. 16, for example. As illustrated, the first and second slots are connected to the interface circuit 252, while the decryption logic circuit 251, the interface circuit 252 and the control section 21 are connected to each other.

The recording medium 6c is mounted in the first slot. The recording medium 6c, mounted in the first slot, contains the encrypted purchased image data 61a and the image processing program 52 stored therein. The recording medium 6d, which is a delivery medium, is mounted in the second slot 2.

The decryption logic circuit 251 has a circuit for generating an encryption key and a system key which are used to decrypt the encrypted purchased image data 61a and which will be explained later, and a circuit for decrypting the purchased image data 61a by using the encryption key and the system key.

The interface circuit 252 writes data in the recording medium 6d in accordance with instructions from the control section 21.

The purchased image data 61a stored in the recording medium 6c has been double encrypted in advance by using the encryption key and the system key, as shown in FIG. 17.

That is, the non-encrypted purchased data 61a is encrypted firstly with the encryption key peculiar to each image. Then, the purchased image data encrypted with the encryption key is further encrypted with the predetermined system key after a header portion which contains information such as the data name and image format, etc. of the purchased image data 61a, is affixed to the purchased image data 61a.

When the mounting of the recording medium 6c in the recording medium driver 25 shown in FIG. 16 is detected by a sensor or the like and an interruption to the control section 21 occurs, the control section 21 executes the process of the image processing program 52.

Then, in response to a user's instruction which designates the image combining process, the control section 21 (the image processing program 52) executes the process shown in FIG. 18, and initiates the procedures for selecting the images to be used in combining.

Firstly, the control section 21 reads out the encrypted purchased image data 61a stored in the recording medium 6c, and transfers it to the decryption logic circuit 251 (a step S81).

Using the system key, the decryption logic circuit 251 decrypts the encrypted purchased image data 61a transferred from the control section 21 and returns the purchased image data to the control section 21 (a step S82). The purchased image data 61a as returned is in the state of having been encrypted with the encryption key, except the header portion.

The control section 21 reads the header portion of the purchased image data 61a returned from the decryption logic circuit 251 and displays, on the display section 4, a list of the purchased image data 61a stored in the recording medium 6c (a step S83).

The user selects an arbitrary image from the displayed list of star's photographs (a step S84). The number of images selected in the step S84 may be plural, as in the case of the procedure of the step S42.

Next, the control section 21 transfers, to the decryption logic circuit 251, the purchased image data 61a which represents the selected star's photograph and which has been released from the encryption performed using the system key (a step S85).

Using the encryption key, the decryption logic circuit 251 decrypts the purchased image data 61a transferred from the control section 21 in the step S85, and returns the purchased image data 61a to the control section (a step S86).

The control section 21 stores, in the storage section 23, the purchased image data 61a returned in the step S86 (a step S87).

Then, the control section 21 causes the display device 4 to display the user image to be used in combining, and the user selects the user image (steps S88 and S89) and processes, edits and combines the user image and the purchased image (steps S90 and S91).

The display and selection of the user image may be performed in substantially the same manner as the above-described steps S43 and S44, and the processing, editing and combining of the images may be performed in substantially the same manner as the above-described steps S45 and 46.

After the user has arbitrarily performed processing and alteration on the screen by using an image purchased by the user, he/she gives the instruction to register the created image in the recording medium 6d in order to print the created image (a step S92).

In response to this instruction, the control section 21 opens a dialog box on the display device 4, and the ID and name of the created image, an instruction as to whether to effect printing or not, the number of prints, etc. are input thereto (a step S93).

With this operation, the control section 21 creates the image combining table 63, based on the input data and the data registered in the storage section 23 (a step S94). Then, the control section 21 sends the created image combining table 63 to the interface circuit 252, and issues the instruction to write the image combining table 63 in the recording medium 6d (a step S95). In accordance with the instruction, the interface circuit 252 stores the image combining table 63 in the recording medium 6d.

Thereafter, the control section 21 deletes the decrypted purchased image data 61a stored in the storage section 23 (a step S96), and terminates the image combining process.

In place of the image ID of the purchased image data 61a, link information representing the logical position at which the purchased image data 61b substantially identical with the selected purchased image data 61a has been stored, may be recorded in the image combining table 63.

For example, in the case where the purchased image data 61b has been stored in a storage device which is accessible across a network such as the Internet or the like, the link information concerning the purchased image data 61b needs only be an URL (Uniform Resource Locator) for the purchased image data 61b.

Furthermore, the image combining table 63 is not necessarily a file which is independent from the user image data 62, and the contents of the image combining table 63 may be described in the header portion of the user image data 62.

Moreover, the decryption logic circuit 251 may be designed to generate a plurality of system keys, which permits the decryption logic circuit 251 to decrypt even the encrypted purchased image data 61a with any one of the plurality of system keys.

Furthermore, instead of being generated by the decryption logic circuit 251, the encryption key and the system key may be recorded, for example, in a ROM or the like connected to the decryption logic circuit 251, and the decryption logic circuit 251 may read out the encryption key and the system key recorded in the ROM or the like to decrypt the purchased image data 61a.

Embodiments of this invention have been explained above. However, this invention is not limited thereto, and various modifications and applications can be made.

In addition, the protection target data in this invention is not limited to a famous person's portrait such as a star's photograph, and may include one protected by any portrait right, image data such as a design, a painting and the like protected by copyrights, a mark protected by a trademark right, etc. Furthermore, data which can be used is not limited to the image data, and includes what are generally called digital contents such as text data, decoded version of those data, etc.

Moreover, the image processing device 2 of the first and second embodiments and the image printing device 10 of the second embodiment can be realized using an ordinary computer system. For example, a copyright use allowing system which executes the above-described processing can be formed by installing a program for executing the above-described operations in a personal computer from a medium (a ROM, a floppy disk, a CD-ROM or the like) containing the program stored therein.

Further, the medium which supplies the program to the computer may be a communication medium (a medium which temporarily or passingly holds the program as in the case of a communication line, a communication network and a communication system). For example, the program may be posted on the bulletin board (BBS) of a communication network and may be distributed across the network.

And the above-described procedures can be executed by activating and executing this program under the control of an OS in the same manner as in the case of other application programs.

As explained above, this invention realizes a simple and convenient system and method which permit the contents protected by various rights like a copy right, a portrait right, etc. to be used privately in such a manner as enjoying the processing and editing of the contents on a screen, while establishing harmony between those various rights and the right to privately use the contents.

And the present invention realizes a simple and convenient system and method by which a charge for using the contents can be collected when making hard copies of the contents protected by various rights such as a copyright, a portrait right, etc.

In addition, this invention is not limited to the above-described embodiments, and can be modified and applied variously.

For example, the physical structures illustrated in FIGS. 1, 8 and 16, as well as the logical structures illustrated in FIGS. 2 and 9, are only examples and can be modified and altered arbitrarily.

Furthermore, the flows shown in FIGS. 5, 10, 12, 15 and 18 are also only examples, and can be modified and altered arbitrarily.

What is claimed is:

1. A contents processing system comprising:

first medium mounting means for detachably mounting a first recording medium including encrypted contents stored therein;

second medium mounting means for detachably mounting a second recording medium including non-encrypted contents stored therein;

third medium mounting means for detachably mounting a third recording medium;

first selection means for selecting arbitrary contents from the encrypted contents stored in said first recording medium in accordance with an instruction from an operator, and for decrypting the selected encrypted contents to generate first contents;

second selection means for selecting arbitrary second contents from the non-encrypted contents stored in said second recording medium in accordance with an instruction from the operator;

combining means for combining said first contents and said second contents in accordance with an instruction from the operator, and creating combining mode data which represents a combing mode;

recording means for storing, in said third recording medium, said encrypted contents representing said first contents, said second contents and said combining mode data, in response to an instruction from the operator; and output means for acquiring the encrypted contents stored in said recording medium, said second contents and said combining mode data, decrypting said encrypted contents to generate said first contents, combining said first contents and said second contents on the basis of said combining mode data as acquired, and outputting an image obtained by the combining.

2. The contents processing system according to claim 1, wherein said recording means comprises encrypted contents recording means for storing the encrypted contents representing said first contents and said combining mode data in said second recording medium, in response to an instruction from the operator.

3. A contents processing system comprising:

first medium mounting means for detachably mounting a first recording medium including encrypted contents stored therein;

second medium mounting means for detachably mounting a second recording medium including non-encrypted contents stored therein;

third medium mounting means for detachably mounting a third recording medium;

first selection means for selecting arbitrary contents from the encrypted contents stored in said first recording medium in accordance with an instruction from an operator, and for decrypting the selected encrypted contents to generate first contents;

second selection means for selecting arbitrary second contents from the non-encrypted contents stored in said second recording medium in accordance with an instruction from the operator;

combining means for combining said first contents and said second contents in accordance with an instruction from the operator, and creating combining mode data which represents a combing mode;

recording means for storing instruction data which identifies said first contents, said second contents and said combining mode data in said third recording medium, in response to an instruction from the operator; and output means for acquiring the instruction data stored in said recording medium, said second contents and said combining mode data, acquiring said first contents designated by said instruction data, combining said first contents and said second contents on the basis of said combining mode data as acquired, and outputting an image obtained by the combining.

4. The contents processing system according to claim 3, wherein said combining means comprises editing means for processing and/or editing at least one of said first and second contents.

5. The contents processing system according to claim 3, wherein said recording means comprises instruction data recording means for storing sad instruction data and said combining mode data in said second recording medium, in response to an instruction from the operator.

6. The contents processing system according to claim 3, wherein:

said instruction data contains address information for specifying a logical location at which said first contents have been stored; and said output means comprises retrieval means for acquiring said first contents stored at the logical location specified by the address information contained in said instruction data.

7. The contents processing system according to claim 3, wherein said combining means comprises editing means for processing and/or editing at least one of said first and second contents.

8. The contents processing system according to claim 3, wherein said output means includes printing means for printing said image.

9. The contents processing system according to claim 8, wherein:

said combining mode data contains information specifying a number by which said image is to be printed by said printing means; and said printing means comprises designated number printing means for printing said image by the number designated by said combining mode data.

10. A contents processing system comprising:

medium mounting means for mounting a first recording medium in which contents protected by a predetermined right have been stored, mounting a second recording medium in which contents have been stored, and mounting a third recording medium;

first selection means for selecting arbitrary first contents from the contents stored in said first recording medium;

second selection means for selecting arbitrary second contents from the contents stored in said second recording medium;

combining means for combining the first contents selected by said first selection means and the second contents selected by said second selection means;

display means for displaying data synthesized by said combining means;

printing instruction means for issuing an instruction to print an image synthesized by said combining means; and recording means for storing, in said third recording medium, instruction data which designates said first contents, said second contents and data which represents a mode of combining said first contents and said second contents, in response to the instruction issued by said printing instruction means; and wherein when storing data, which specifies details of combined contents, in said third recording medium for the sake of printing by an external printing agency, said first contents themselves, protected by the predetermined right, are not stored in said third recording medium.

11. The contents processing system according to claim 10, wherein said medium mounting means comprises means for detachably mounting at least one of said first, second and third recording mediums.

12. The contents processing system according to claim 10, wherein said contents processing system comprises means for detecting a printing instruction, means for detecting whether an image to be printed includes the contents recorded in said first recording medium, and means for inhibiting printing when it is determined that the image to be printed includes the contents recorded in said first recording medium.

13. A contents processing control device comprising:

first medium mounting means for detachably mounting a first recording medium including non-encrypted contents stored therein;

second medium mounting means for detachably mounting a second recording medium;

decryption means for acquiring encrypted contents representing encrypted first contents, decrypting said encrypted contents, and sending the decrypted first contents to a supplier of said encrypted contents; and control means for controlling a computer, detachably connected thereto and comprising means for detachably mounting a third recording medium including said encrypted contents stored therein, so as to cause said computer to serve as first selection means for accessing said first recording medium in accordance with an instruction from an operator and for selecting arbitrary second contents from said non-encrypted contents, second selection means for acquiring arbitrary contents from said encrypted contents stored in said third recording medium in accordance with an instruction from the operator and for supplying the acquired encrypted contents to said decryption means as ones representing said first contents, combining means for acquiring said first contents supplied from said decryption means, combining said first contents and said second contents in accordance with an instruction from the operator and creating combining mode data representing a combining mode, and storage means for accessing said second recording medium in response to an instruction from the operator and for storing, in said third recording medium, said encrypted contents representing said first contents, said second contents and said combining mode data.

14. A contents processing method comprising:
- a first medium mounting step of detachably mounting a first recording medium including encrypted contents stored therein;
- a second medium mounting step of detachably mounting a second recording medium including non-encrypted contents stored therein;
- a third medium mounting step of detachably mounting a third recording medium;
- a first selection step of selecting arbitrary contents from the encrypted contents stored in said first recording medium in accordance with an instruction from an operator, and decrypting the selected encrypted contents to generate first contents;
- a second selection step of selecting arbitrary second contents from the non-encrypted contents stored in said second recording medium in accordance with an instruction from the operator;
- a combining step of combining said first contents and said second contents in accordance with an instruction from the operator, and creating combining mode data representing a combining mode; and
- a recording step of storing, in said third recording medium, said encrypted contents representing said first contents, said second contents and said combining mode data, in response to an instruction from the operator.

15. A computer readable recording medium containing a program stored therein for causing a computer, which comprises means for detachably mounting a first recording medium including encrypted contents stored therein, means for detachably mounting a second recording medium including non-encrypted contents stored therein, and means for detachably mounting a third recording medium, to serve as:
- first selection means for selecting arbitrary contents from the encrypted contents stored in said first recording medium in accordance with an instruction from an operator, and for decrypting the selected encrypted contents to generate first contents;
- second selection means for selecting arbitrary second contents from the non-encrypted contents stored in said second recording medium in accordance with an instruction from the operator;
- combining means for combining said first contents and said second contents in accordance with an instruction from the operator, and creating combining mode data which represents a combining mode; and
- recording means for storing, in said third recording medium, said encrypted contents representing said first contents, said second contents and said combining mode data, in response to an instruction from the operator.

16. A computer readable recording medium containing a program stored therein for causing a computer to serve as:
- first selection means for selecting first contents from contents protected by a predetermined right;
- second selection means for selecting second contents from arbitrary contents;
- combining means for combining the first contents selected by said first selection means and the second contents selected by said second selection means;
- display means for displaying data synthesized by said combining means;
- printing instruction means for issuing an instruction to print an image synthesized by said combining means; and
- recording means for storing, in a recording medium, instruction information which designates said first contents, said second contents and data which represents a mode of combining said first contents and said second contents, for the sake of printing to be performed externally.

17. A computer readable recording medium containing a program stored therein for:
causing a computer to serve as
- first selection means for selecting first contents from encrypted contents protected by a predetermined right;
- second selection means for selecting second contents from arbitrary contents;
- combining means for combining the first contents selected by said first selection means and the second contents selected by said second selection means;
- display means for displaying data synthesized by said combining means;
- printing instruction means for issuing an instruction to print an image synthesized by said combining means; and
- recording means for storing, in a recording medium, instruction information which designates said first contents, said second contents and data which represents a mode of combining said first contents and said second contents, for the sake of printing to be performed externally; and
causing at least one of said first selection means and said combining means to serve as decryption means for decrypting said first contents.

* * * * *

UNITED STATES PATENT AND TRADEMARK OFFICE
CERTIFICATE OF CORRECTION

PATENT NO.        : 6,209,097 B1
APPLICATION NO.   : 09/204000
DATED             : March 27, 2001
INVENTOR(S)       : Isamu Iwamoto Page 1 of 1

It is certified that error appears in the above-identified patent and that said Letters Patent is hereby corrected as shown below:

ON THE FACE OF THE PATENT:

Delete "Inventor: Ryo Nakayama".

Signed and Sealed this

Twenty-eighth Day of November, 2006

JON W. DUDAS
*Director of the United States Patent and Trademark Office*